(12) United States Patent
Lee

(10) Patent No.: US 12,477,249 B2
(45) Date of Patent: Nov. 18, 2025

(54) IMAGE SENSOR INCLUDING COUNTER PERFORMING SHIFTING OPERATION AND OPERATION METHOD THEREOF

(71) Applicant: SAMSUNG ELECTRONICS CO., LTD., Suwon-si (KR)

(72) Inventor: Hyeokjong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 18/371,167

(22) Filed: Sep. 21, 2023

(65) Prior Publication Data

US 2024/0292132 A1 Aug. 29, 2024

(30) Foreign Application Priority Data

Feb. 24, 2023 (KR) ........................ 10-2023-0024686

(51) Int. Cl.
*H04N 25/78* (2023.01)
*H04N 25/704* (2023.01)
*H04N 25/75* (2023.01)
*H04N 25/77* (2023.01)

(52) U.S. Cl.
CPC .......... *H04N 25/78* (2023.01); *H04N 25/704* (2023.01); *H04N 25/75* (2023.01); *H04N 25/77* (2023.01)

(58) Field of Classification Search
CPC .... H04N 25/704; H04N 25/75; H04N 25/766; H04N 25/77; H04N 25/78; H03K 5/24; H03K 21/00; H03M 7/04
See application file for complete search history.

(56) References Cited

U.S. PATENT DOCUMENTS

| | | |
|---|---|---|
| 7,642,947 B2 | 1/2010 | Suzuki et al. |
| 8,576,979 B2 | 11/2013 | Mo et al. |
| 8,625,012 B2 | 1/2014 | Yuan et al. |
| 11,317,047 B2 | 4/2022 | Han et al. |
| 11,425,323 B2 | 8/2022 | Kim et al. |
| 2019/0052827 A1* | 2/2019 | Koyama ................. H03M 1/34 |
| 2020/0389610 A1 | 12/2020 | Kim et al. |
| 2022/0269482 A1* | 8/2022 | Fan ......................... G06F 7/507 |
| 2023/0262363 A1 | 8/2023 | Lee |

FOREIGN PATENT DOCUMENTS

| | | |
|---|---|---|
| CN | 101800837 A | 8/2010 |
| JP | 5076568 B2 | 11/2012 |
| KR | 10-2022-0033357 A | 3/2022 |
| KR | 10-2023-0121528 A | 8/2023 |

* cited by examiner

*Primary Examiner* — Lin Ye
*Assistant Examiner* — Chriss S Yoder, III
(74) *Attorney, Agent, or Firm* — Sughrue Mion, PLLC

(57) ABSTRACT

Disclosed is a counter which generates a binary code and a digital signal The counter includes: a reset memory circuit configured to store a sum of N reset binary codes, each of the N reset binary codes corresponding to a result of comparing a reset signal of the pixel signal with the ramp signal, and to calculate one of the N reset binary codes by performing a shifting operation on the sum of the N reset binary codes; and an output memory circuit configured to output the digital signal based on the N reset binary codes, a first image binary code indicating a result of comparing a first image signal of the pixel signal with the ramp signal once, and N sum binary codes, the N sum binary codes respectively indicating N results of comparing a sum signal of the pixel signal with the ramp signal.

20 Claims, 15 Drawing Sheets

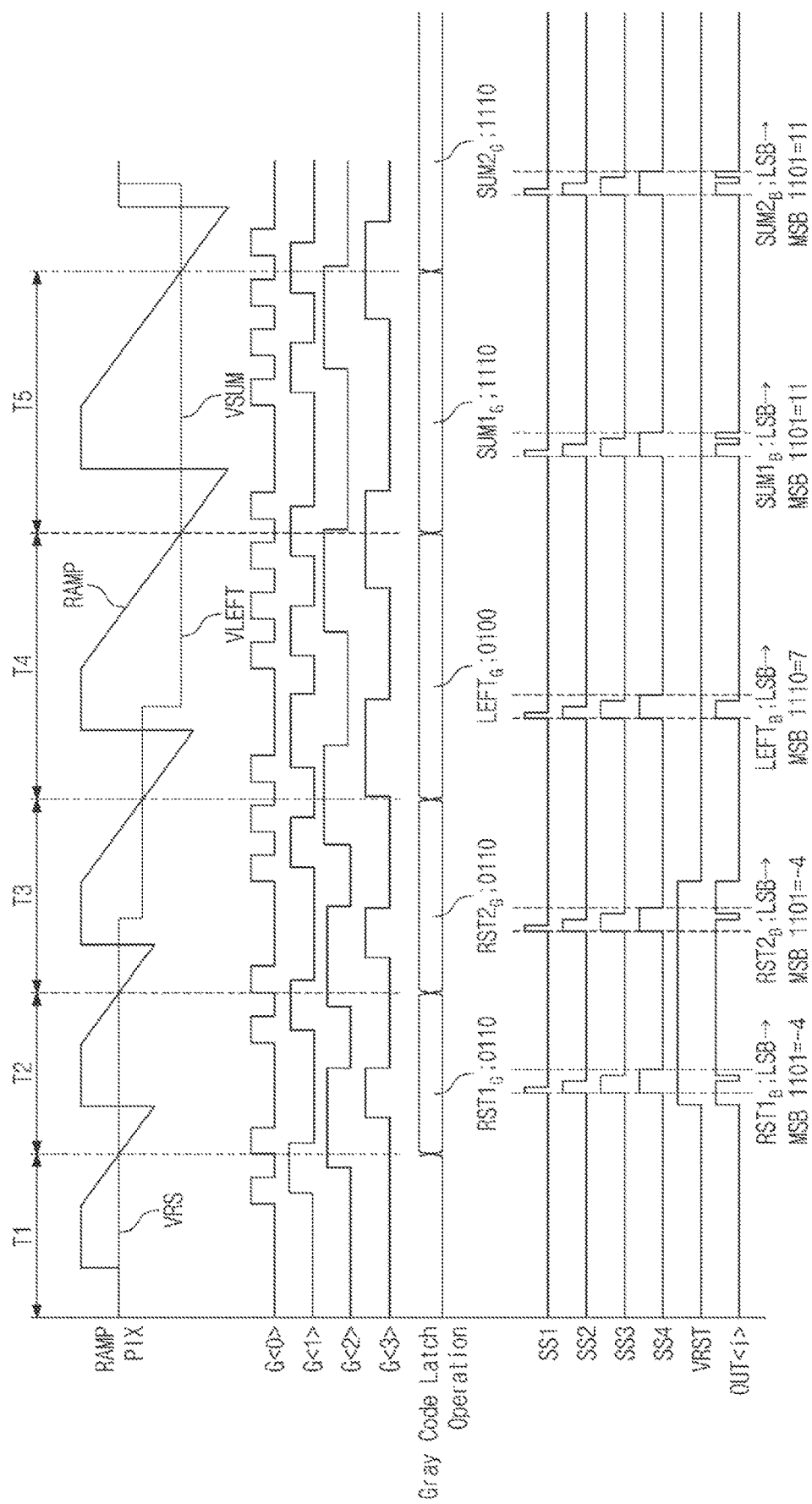

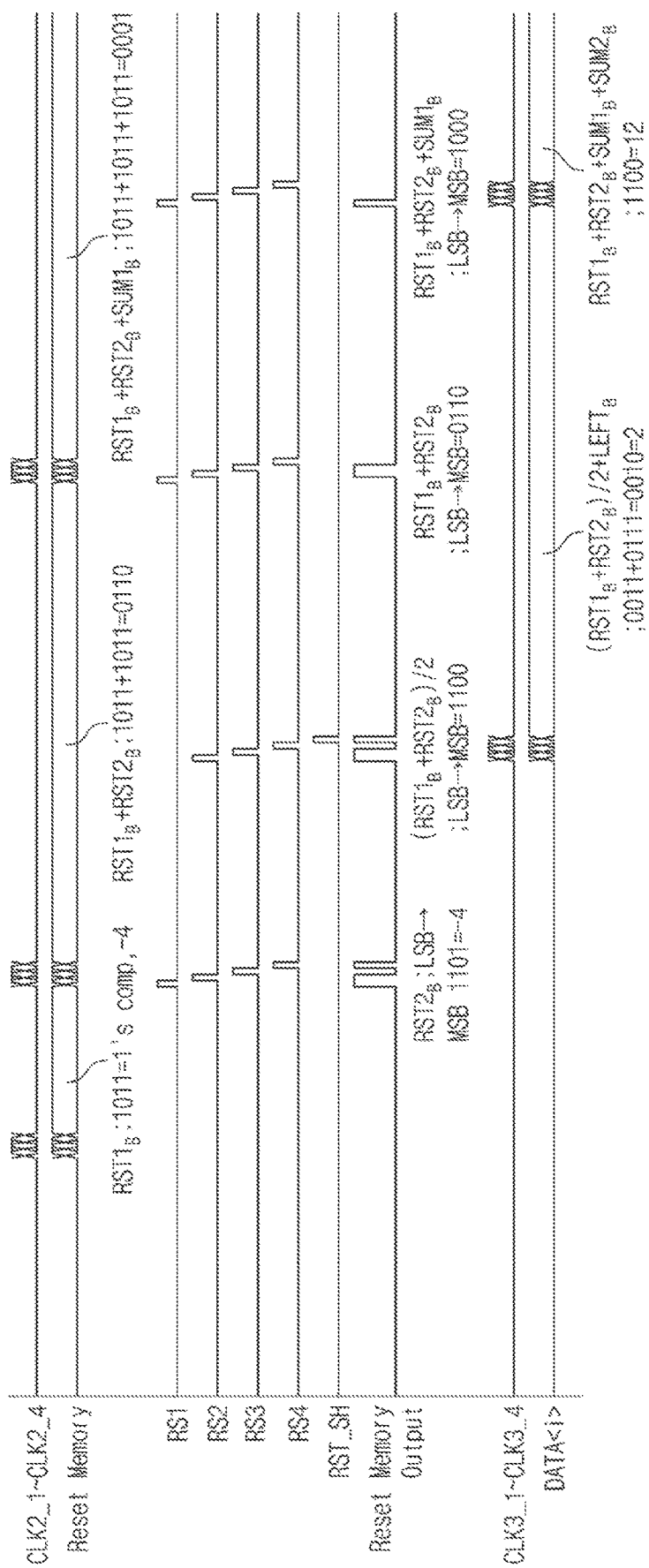

IMAGE SENSOR INCLUDING COUNTER PERFORMING SHIFTING OPERATION AND OPERATION METHOD THEREOF

CROSS-REFERENCE TO RELATED APPLICATION

This application claims priority to Korean Patent Application No. 10-2023-0024686, filed on Feb. 24, 2023, in the Korean Intellectual Property Office, the disclosure of which is incorporated by reference herein in its entirety.

BACKGROUND

The present disclosure relates to an electronic device, and more particularly, to an image sensor including a counter performing a shifting operation and an operation method thereof.

An image sensor may be a charge coupled device (CCD) image sensor, a complementary metal-oxide semiconductor (CMOS) image sensor (CIS), etc. The CMOS image sensor may include pixels composed of CMOS transistors and may convert light energy into an electrical signal by using a photoelectric conversion element included in each pixel. The CMOS image sensor may obtain information about a captured/photographed image by using the electrical signal generated by each pixel.

An analog-to-digital converter (ADC) may receive an analog input voltage from a pixel and convert the analog input voltage into a digital signal. The digital signal may be provided to other devices. The ADC may be used in various signal processing devices. The ADC may reduce a noise of the image sensor by obtaining multiple samples. However, in the case where a counter individually stores all the sampling results, an increased number of circuits may be included in the counter, which increases the area occupied by the counter. Accordingly, there is a need for a method minimizing the area of the counter even while obtaining multiple samples.

SUMMARY

One or more example embodiments provide an image sensor including a counter performing a shifting operation and an operation method thereof.

According to an aspect of an example embodiment, counter generates a binary code corresponding to a result of comparing a pixel signal output from a plurality of pixel groups of a pixel array with a ramp signal and generates a digital signal corresponding to the pixel signal based on the binary code. The counter includes: a reset memory circuit configured to store a sum of N reset binary codes, each of the N reset binary codes corresponding to a result of comparing a reset signal of the pixel signal with the ramp signal, and to calculate one of the N reset binary codes by performing a shifting operation on the sum of the N reset binary codes; and an output memory circuit configured to output the digital signal based on the N reset binary codes, a first image binary code indicating a result of comparing a first image signal of the pixel signal with the ramp signal once, and N sum binary codes, the N sum binary codes respectively indicating N results of comparing a sum signal of the pixel signal with the ramp signal. N is an integer of 2 or more. The first image signal is output from some of pixels in each of the plurality of pixel groups, and the sum signal is output from each of the pixels included in each of the plurality of pixel groups.

According to an aspect of an example embodiment, an image sensor includes: a pixel array configured to generate a pixel signal and including a plurality of pixel groups, wherein each of the plurality of pixel groups includes a first pixel including a first photoelectric conversion element and a second pixel including a second photoelectric conversion element; a ramp signal generator configured to generate a ramp signal; and an analog-to-digital converting circuit configured to convert the pixel signal into a digital signal. The analog-to-digital converting circuit includes: a comparator configured to generate a first comparison signal by comparing a reset signal of the pixel signal with the ramp signal in a first period, a second comparison signal by comparing the reset signal of the pixel signal with the ramp signal in a second period, a third comparison signal by comparing a first image signal of the pixel signal with the ramp signal in a third period, a fourth comparison signal by comparing a sum signal of the pixel signal with the ramp signal in a fourth period and a fifth comparison signal by comparing the sum signal of the pixel signal with the ramp signal in a fifth period, wherein the first image signal is based on the first photoelectric conversion element, and the sum signal is based on both the first photoelectric conversion element and the second photoelectric conversion element; and a counter circuit configured to generate a first binary code corresponding to the first comparison signal and a second binary code corresponding to the second comparison signal, to perform a shifting operation on a sum of a first reset binary code corresponding to the first comparison signal and a second reset binary code corresponding to the second comparison signal, and to generate the digital signal corresponding to the pixel signal based on a result of the shifting operation.

According to an aspect of an example embodiment, a method of method of operating an image sensor which includes a pixel array including a plurality of pixel groups and an analog-to-digital converting circuit including a comparator and a counter, includes: generating, at the comparator, a first reset comparison signal by comparing a reset signal of a pixel signal with a ramp signal in a first period; generating, at the comparator, a second reset comparison signal by comparing the reset signal of the pixel signal with the ramp signal in a second period; generating, at the comparator, a first image comparison signal by comparing a first image signal of the pixel signal with the ramp signal in a third period; performing, at the counter, a shifting operation on a sum of a first reset binary code and a second reset binary code respectively corresponding to the first reset comparison signal and the second reset comparison signal; outputting, at the counter, a first digital signal based on a result of the shifting operation and a first image binary code corresponding to the first image comparison signal; generating, at the comparator, a first sum comparison signal by comparing a sum signal of the pixel signal with the ramp signal in a fourth period; generating, at the comparator, a second sum comparison signal by comparing the sum signal of the pixel signal with the ramp signal in a fifth period; and outputting, at the counter, a second digital signal based on the first reset binary code, the second reset binary code, a first sum binary code corresponding to the first sum comparison signal, and a second sum binary code corresponding to the second sum comparison signal.

BRIEF DESCRIPTION OF THE FIGURES

The above and other aspects and features will be more clearly understood from the following description of example embodiments, taken in conjunction with the accompanying drawings.

FIGS. 9A and 9B are timing diagrams illustrating an operation of a counter of FIG. 6 according to an example embodiment.

DETAILED DESCRIPTION

Below, example embodiments will be described with reference to the accompanying drawings. Embodiments described herein are provided as examples, and thus, the present disclosure is not limited thereto, and may be realized in various other forms. Each example embodiment provided in the following description is not excluded from being associated with one or more features of another example or another example embodiment also provided herein or not provided herein but consistent with the present disclosure.

In the detailed description, components described with reference to the terms "part", "unit", "module", "block", "~er or ~or", etc., and function blocks illustrated in drawings may be implemented with software, hardware, or a combination thereof. For example, the software may include a machine code, firmware, an embedded code, application software, or a combination thereof. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
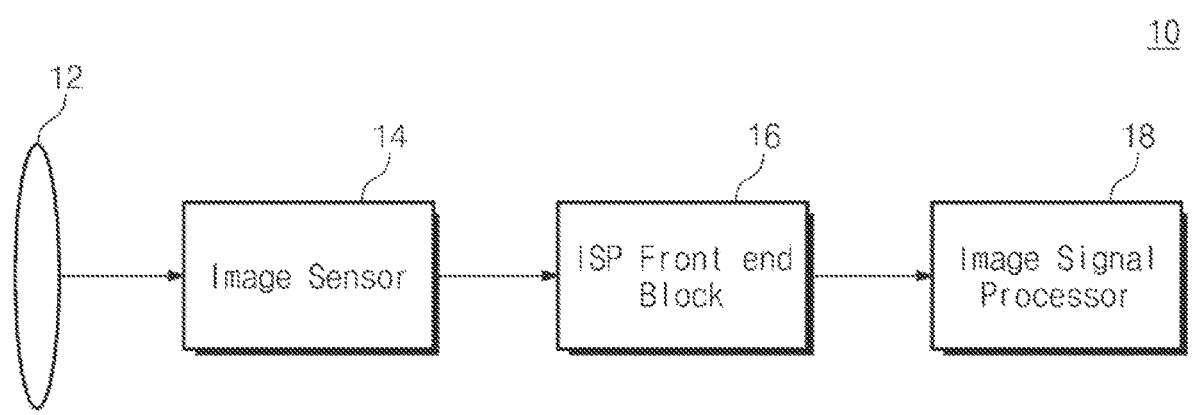
FIG. 1 illustrates configuration of an image processing system according to an example embodiment.

FIG. 1 illustrates configuration of an image processing system 10 according to an example embodiment. The image processing system 10 may be implemented as a part of various electronic devices such as a smartphone, a digital camera, a laptop computer, and a desktop computer. In particular, the image processing system 10 according to an example embodiment may be mounted in an electronic device having an auto focusing function. The image processing system 10 may include a lens 12, an image sensor 14, an image signal processor (ISP) front end block 16, and an image signal processor 18.

A light may be reflected (or emitted) by an object, a scenery, etc., targeted for photographing, and the lens 12 may receive the reflected light. The image sensor 14 may generate an electrical signal based on the light received through the lens 12. For example, the image sensor 14 may be implemented with a complementary metal oxide semiconductor (CMOS) image sensor. For example, the image sensor 14 may be a multi-pixel image sensor having a dual pixel structure or a tetracell structure.

The image sensor 14 may include a pixel array. Pixels of the pixel array may convert a light into electrical signals and may generate pixel values. In addition, the image sensor 14 may include an analog-to-digital converting (ADC) circuit for performing correlated double sampling (CDS) on the pixel values. A configuration of the image sensor 14 will be described in detail with reference to FIG. 2.

The ISP front end block 16 (e.g., ISP front end circuit) may perform pre-processing operations on the electrical signals output from the image sensor 14 so as to be appropriate for processing of the image signal processor 18.

The image signal processor 18 may generate image data associated with the photographed object, scenery, etc., by appropriately processing the electrical signals provided by the ISP front end block 16. To this end, the image signal processor 18 may perform various processing such as color correction, auto white balance, gamma correction, color saturation correction, formatting, bad pixel correction, and hue correction. Also, the image signal processor 18 may generate data for performing the auto focusing function based on the electrical signals output from the image sensor 14.

FIG. 1 shows one lens 12 and one image sensor 14. However, in another example embodiment, the image processing system 10 may include a plurality of lenses, a plurality of image sensors, and a plurality of ISP front end blocks. In this case, the plurality of lenses may have different fields of view. Also, the plurality of image sensors may have different functions, different levels of performance, and/or different characteristics and may include pixel arrays of different configurations.

Figure 2:
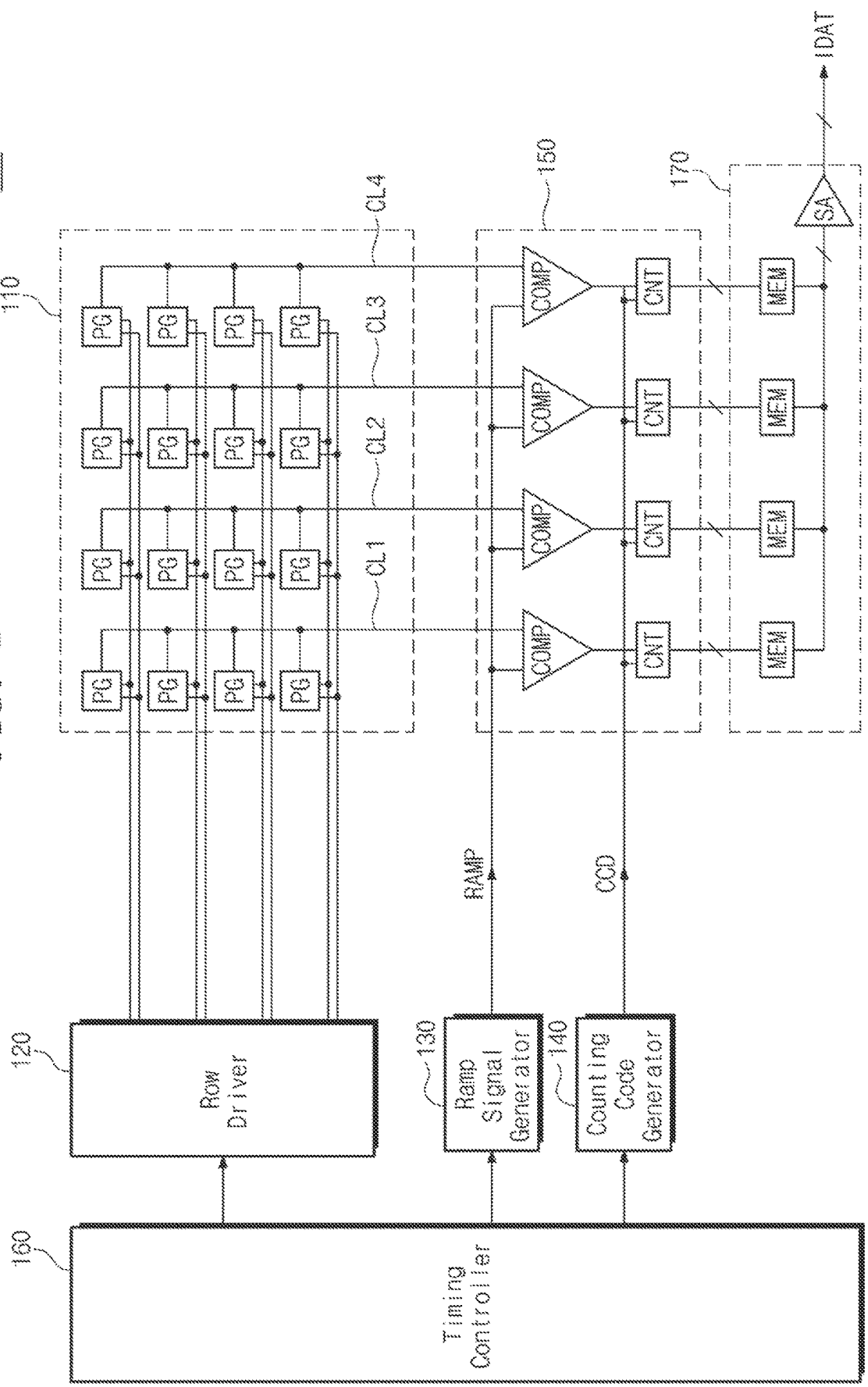
FIG. 2 illustrates configuration of an image sensor of FIG. 1 according to an example embodiment.

FIG. 2 illustrates configuration of the image sensor 14 of FIG. 1 according to an example embodiment. An image sensor 100 may include a pixel array 110, a row driver 120, a ramp signal generator 130, a counting code generator 140, an ADC circuit 150, a timing controller 160, and a buffer 170.

The pixel array 110 may include a plurality of pixels arranged in the form of a matrix, that is, arranged along rows and columns. Each of the plurality of pixels may include a photoelectric conversion element. For example, the photoelectric conversion element may include a photodiode, a photo transistor, a photo gate, or a pinned photodiode.

The pixel array 110 may include a plurality of pixel groups PG. Each of the pixel groups PG may include two or more pixels. A plurality of pixels constituting a pixel group may share one floating diffusion region or a plurality of floating diffusion regions. An example in which the pixel array 110 includes the pixel groups PG arranged in the form of a matrix with four rows and four columns (i.e., includes 4×4 pixel groups PG) is illustrated in FIG. 2. However, the present disclosure is not limited thereto.

The pixel group PG may include pixels of the same color. For example, the pixel group PG may include a red pixel to convert a light of a red spectrum into an electrical signal, a green pixel to convert a light of a green spectrum into an electrical signal, or a blue pixel to convert a light of a blue spectrum into an electrical signal. For example, the pixels constituting the pixel array 110 may be arranged in the form of a tetra-Bayer pattern. Also, a micro lens and a color filter may be stacked on/over each pixel. The color filter may transmit a light of a specific color among the light incident through the micro lens, that is, a wavelength of a specific color region and a color that the pixel is capable of detecting may be determined depending on the color filter provided in the pixel.

The pixels of the pixel array 110 may output pixel signals through column lines CL1 to CL4, depending on the intensity or the amount of light incident from the outside. For example, the pixel signal may be an analog signal corresponding to the intensity or the amount of light incident from the outside. In addition, auto focusing data for the auto focusing function may be generated by the image signal processor 18 (refer to FIG. 1) based on the pixel signals output from the plurality of pixels. The pixel signals may pass through voltage buffers (e.g., source followers) and may then be provided to the ADC circuit 150 through the column lines CL1 to CL4.

The row driver 120 may select and drive a row of the pixel array 110. The row driver 120 may decode an address and/or a control signal generated by the timing controller 160 and may generate control signals for selecting and driving a row of the pixel array 110. For example, the control signals may include a signal for selecting a pixel, a signal for resetting a floating diffusion region, etc.

The ramp signal generator 130 may generate a ramp signal RAMP under control of the timing controller 160. For example, the ramp signal generator 130 may operate in response to a control signal such as a ramp enable signal. When the ramp enable signal is activated, the ramp signal generator 130 may generate the ramp signal RAMP based on preset values (e.g., a start level, an end level, and a slope). In this regard, the ramp signal RAMP may be a signal that increases or decreases along a preset slope during a specific time. The ramp signal RAMP may be provided to the ADC circuit 150.

The counting code generator 140 may generate a counting code CCD under control of the timing controller 160. The counting code CCD may be provided to each of a plurality of counters CNT. For example, the counting code generator 140 may be implemented with a gray code generator. The counting code generator 140 may generate a plurality of code values whose resolution is determined by a set number of bits, as the counting code CCD. For example, when a 10-bit code is set, the counting code generator 140 may generate the counting code CCD including 1024 code values that sequentially increase or decrease.

The ADC circuit 150 may receive pixel signals from the plurality of pixels of the pixel array 110 through the column lines CL1 to CL4, and may receive the ramp signal RAMP from the ramp signal generator 130. The ADC circuit 150 may operate based on a correlated double sampling (CDS) technique for obtaining a reset signal and an image signal from the received pixel signal, and may extract a difference between the reset signal and the image signal as an effective signal component. The ADC circuit 150 may include a plurality of comparators COMP and the plurality of counters CNT.

In detail, each of the comparators COMP may perform correlated double sampling (CDS) by comparing the reset signal of the pixel signal with the ramp signal RAMP, and comparing the image signal of the pixel signal with the ramp signal RAMP. Each of the counters CNT may count pulses of the signal experiencing the correlated double sampling based on the counting code CCD and may output a counting result as a digital signal. An example in which the ADC circuit 150 includes four comparators COMP and four counters CNT is illustrated in FIG. 2, but the present disclosure is not limited thereto.

The timing controller 160 may generate a control signal and/or a clock for controlling an operation and/or a timing of each of the row driver 120, the ramp signal generator 130, the counting code generator 140, and the ADC circuit 150.

The buffer 170 may include memories MEM and a sense amplifier SA. The memories MEM may store digital signals output from the corresponding counters CNT of the ADC circuit 150. The sense amplifier SA may sense and amplify the digital signals stored in the memories MEM. The sense amplifier SA may output the amplified digital signals as image data IDAT, and the image data IDAT may be provided to the ISP front end block 16 of FIG. 1.

Figure 3:
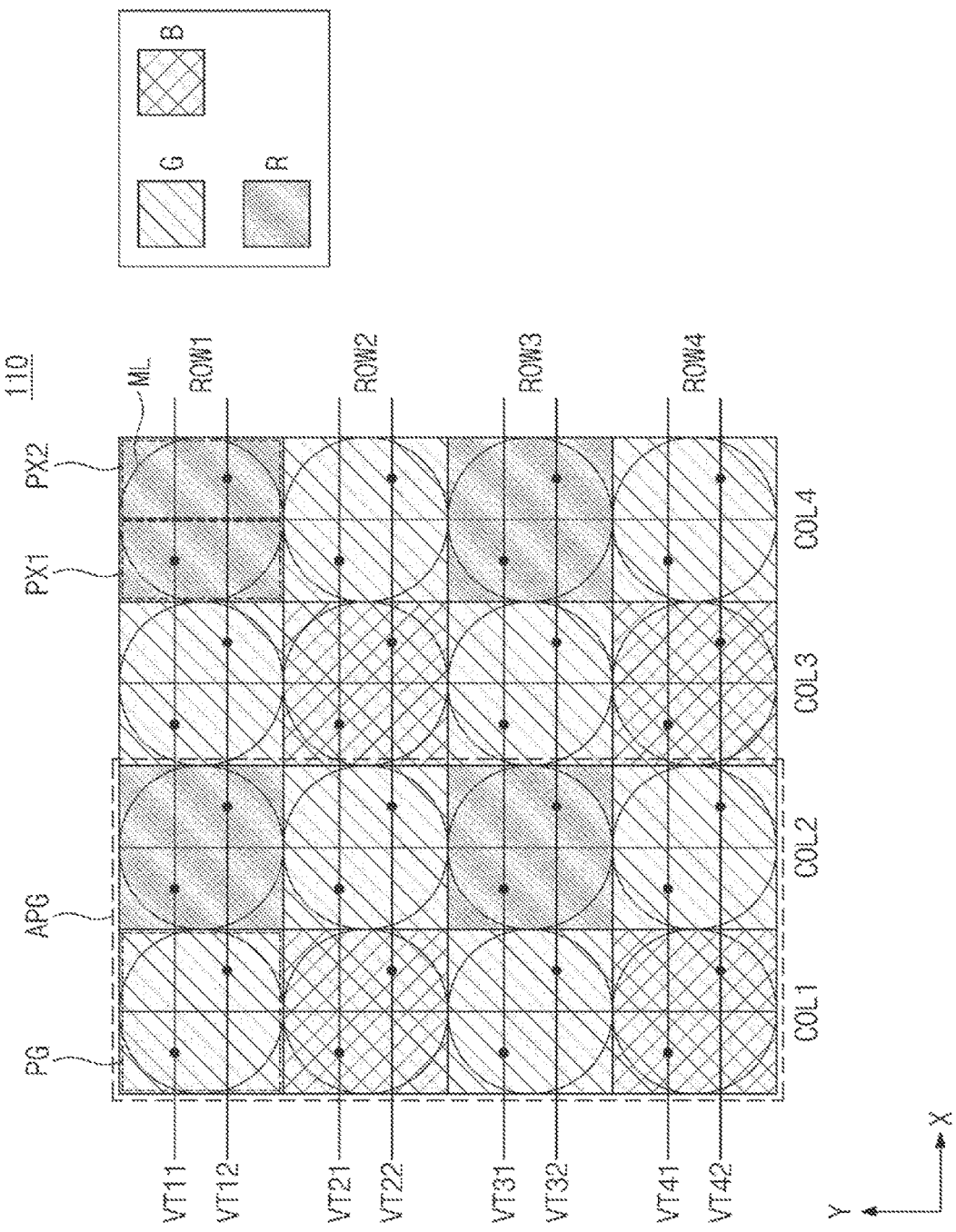
FIG. 3 illustrates configuration of a pixel array of FIG. 2 according to an example embodiment.

FIG. 3 illustrates configuration of the pixel array 110 of FIG. 2 according to an example embodiment. Referring to FIG. 3, one of the plurality of pixel groups PG of the pixel array 110 may include a plurality of green pixels "G", another one of the plurality of pixel groups PG may include a plurality of blue pixels "B", and still another one of the plurality of pixel groups may include a plurality of red pixels "R". For example, the pixel groups PG may be arranged so that, between four of the pixel groups PG, two green pixels "G", one blue pixel "B", and one red pixel "R" may be disposed in the form of a 2×2 matrix, and two green pixels "G" may be disposed in a diagonal direction. The above pixel pattern (i.e., a tetra-Bayer pattern) may be repeatedly disposed in the pixel array 110.

Each of the plurality of pixel groups PG may include a micro lens ML and two pixels PX1 and PX2. The first pixel PX1 and the second pixel PX2 may be disposed side by side in an x-direction. For example, in each pixel group PG, the first pixel PX1 may be disposed on the left, and the second pixel PX2 may be disposed on the right.

The plurality of first pixels PX1 may operate in response to a plurality of first transfer signals VT11, VT21, VT31, and VT41, and the plurality of second pixels PX2 may operate in response to a plurality of second transfer signals VT12, VT22, VT32, and VT42. Herein, that the first pixel PX1 and the second pixel PX2 operate indicates that photoelectric conversion elements (e.g., photoelectric conversion elements PD1 and PD2 of FIG. 4) respectively included in the first pixel PX1 and the second pixel PX2 are connected to floating diffusion regions (e.g., FD1 and FD2 of FIG. 4) of the pixel group PG, allowing photoelectrons generated by photoelectric conversion elements (e.g., photoelectric conversion elements PD1 and PD2 of FIG. 4) respectively included in the first pixel PX1 and the second pixel PX2 to be transferred to floating diffusion regions (e.g., FD1 and FD2 of FIG. 4) of the pixel group PG.

The pixel array 110 may output, as a pixel signal, first pixel signals generated from the first pixels PX1, second pixel signals generated from the second pixels PX2, or sum pixel signals generated from both the first pixels PX1 and the second pixels PX2. The first pixel signals and the second pixel signals may be used to generate the auto focusing data, and the sum pixel signals may be used to generate an image in units of frame.

The pixel array 110 may be divided into a plurality of auto focusing pixel groups APG, and each of the plurality of auto focusing pixel groups APG may include at least two pixel groups (e.g., the pixel groups PG disposed in the form of a 2×2 matrix) disposed adjacent in a Y-direction. The auto focusing pixel group APG may be a pixel unit for generating the auto focusing data.

For example, the auto focusing data (e.g., a phase detection signal pair for calculating a phase difference necessary for adjusting a focus in left and right directions) may be generated based on the first pixel signals and the second pixel signals generated from the pixel groups PG included in the auto focusing pixel group APG. In this case, the first pixel signals generated from the first pixels PX1 may be output from the pixel groups PG disposed at a given row among a plurality of rows ROW1 to ROW4, and the second pixel signals generated from the second pixels PX2 may be output from the pixel groups PG disposed at a given other row among the plurality of rows ROW1 to ROW4.

Figure 4:
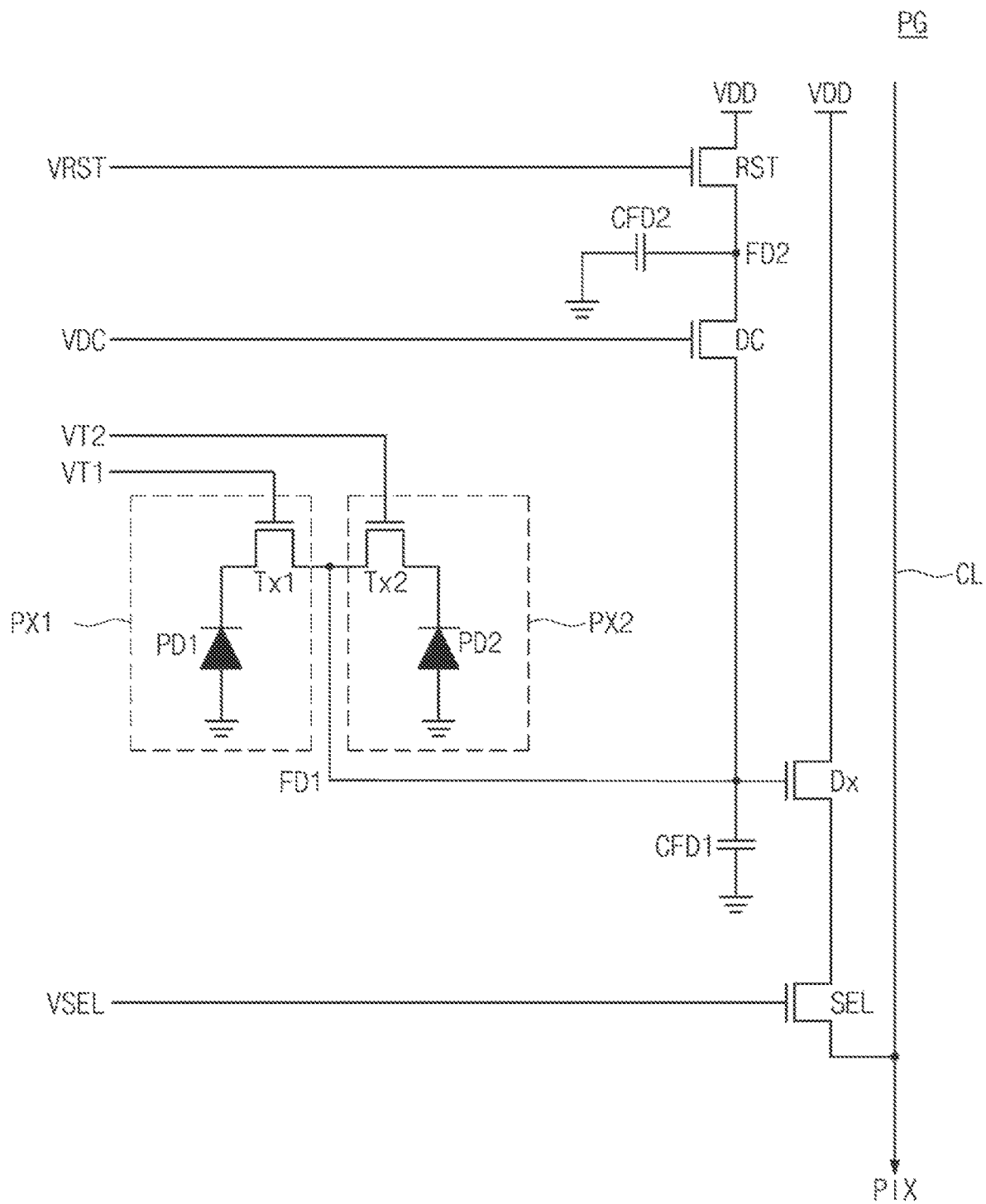
FIG. 4 is a circuit diagram illustrating a pixel group of a pixel array of FIG. 2 according to an example embodiment.

FIG. 4 is a circuit diagram illustrating the pixel group PG of the pixel array 110 of FIG. 2. Referring to FIG. 4, the pixel group PG may include the pixels PX1 and PX2, photoelectric conversion elements PD1 and PD2, transfer transistors Tx1 and Tx2, a reset transistor RST, a dual conversion transistor DC, a drive transistor Dx, and a select transistor SEL.

The first pixel PX1 may include the first photoelectric conversion element PD1 and the first transfer transistor Tx1, and the second pixel PX2 may include the second photoelectric conversion element PD2 and the second transfer transistor Tx2. The pixels PX1 and PX2 may share the reset transistor RST, the dual conversion transistor DC, the drive transistor Dx, and the select transistor SEL. Also, the pixels PX1 and PX2 may share a first floating diffusion region FD1.

The first floating diffusion region FD1 or a second floating diffusion region FD2 may accumulate charges corresponding to the amount of incident light. While the transfer transistors Tx1 and Tx2 are respectively turned on by transfer signals VT1 and VT2, the first floating diffusion region FD1 or the second floating diffusion region FD2 may accumulate charges supplied from the photoelectric conversion elements PD1 and PD2. Because the first floating diffusion region FD1 is connected to a gate terminal of the drive transistor Dx operating as a source follower amplifier, a voltage corresponding to the amount of charges accumulated at the first floating diffusion region FD1 may be formed. For example, a capacitance of the first floating diffusion region FD1 is depicted as a first capacitance CFD1.

The dual conversion transistor DC may be driven by a dual conversion signal VDC. When the dual conversion transistor DC is turned off, the capacitance of the first floating diffusion region FD1 may correspond to the first capacitance CFD1. In a normal environment, because the first floating diffusion region FD1 is not easily saturated, there is no need to increase the capacitance (i.e., CFD1) of the first floating diffusion region FD1. In this case, the dual conversion transistor DC may be turned off.

However, in a high-illuminance environment, the first floating diffusion region FD1 may be easily saturated. To prevent the saturation, the dual conversion transistor DC may be turned on such that the first floating diffusion region FD1 and the second floating diffusion region FD2 are electrically connected. In this case, a capacitance of the floating diffusion regions FD1 and FD2 may be increased to a sum of the first capacitance CFD1 and a second capacitance CFD2.

The transfer transistors Tx1 and Tx2 may be respectively driven by the transfer signals VT1 and VT2, and may transfer charges generated (or integrated) by the photoelectric conversion elements PD1 and PD2 to the first floating diffusion region FD1 or the second floating diffusion region FD2. For example, first ends of the transfer transistors Tx1 and Tx2 may be respectively connected to the photoelectric conversion elements PD1 and PD2, and second ends thereof may be connected in common to the first floating diffusion region FD1.

The reset transistor RST may be driven by a reset control signal VRST and may provide a power supply voltage VDD to the first floating diffusion region FD1 or the second floating diffusion region FD2. As such, the charges accumulated at the first floating diffusion region FD1 or the second floating diffusion region FD2 may move to a terminal for the power supply voltage VDD, and a voltage of the first floating diffusion region FD1 or the second floating diffusion region FD2 may be reset.

The drive transistor Dx may amplify a voltage of the first floating diffusion region FD1 or the second floating diffusion region FD2 to generate a pixel signal PIX. The select transistor SEL may be driven by a selection signal VSEL and may select pixels to be read in units of row. When the select transistor SEL is turned on, the pixel signal PIX may be output to the ADC circuit 150 of FIG. 2 through a column line CL. As described with reference to FIG. 3, the auto focusing data may be generated based on a first pixel signal generated from the first pixel PX1 and a second pixel signal generated from the second pixel PX2, and an image of a frame unit may be generated based on a sum pixel signal, which includes both the first pixel signal and the second pixel signal.

An example in which the pixel array 110 of FIG. 3 includes 4×4 pixel groups PG and each of the pixel groups PG includes two pixels PX1 and PX2 is illustrated in FIG. 4, and an example in which the pixel group PG has a structure where the two pixels PX1 and PX2 include the photoelectric conversion elements PD1 and PD2 respectively is illustrated in FIG. 4. However, the present disclosure is not limited thereto. For example, the pixel array 110 and the pixel group PG may be implemented to have various structures, and a method of generating the auto focusing data may be variously changed or modified.

Figure 5:
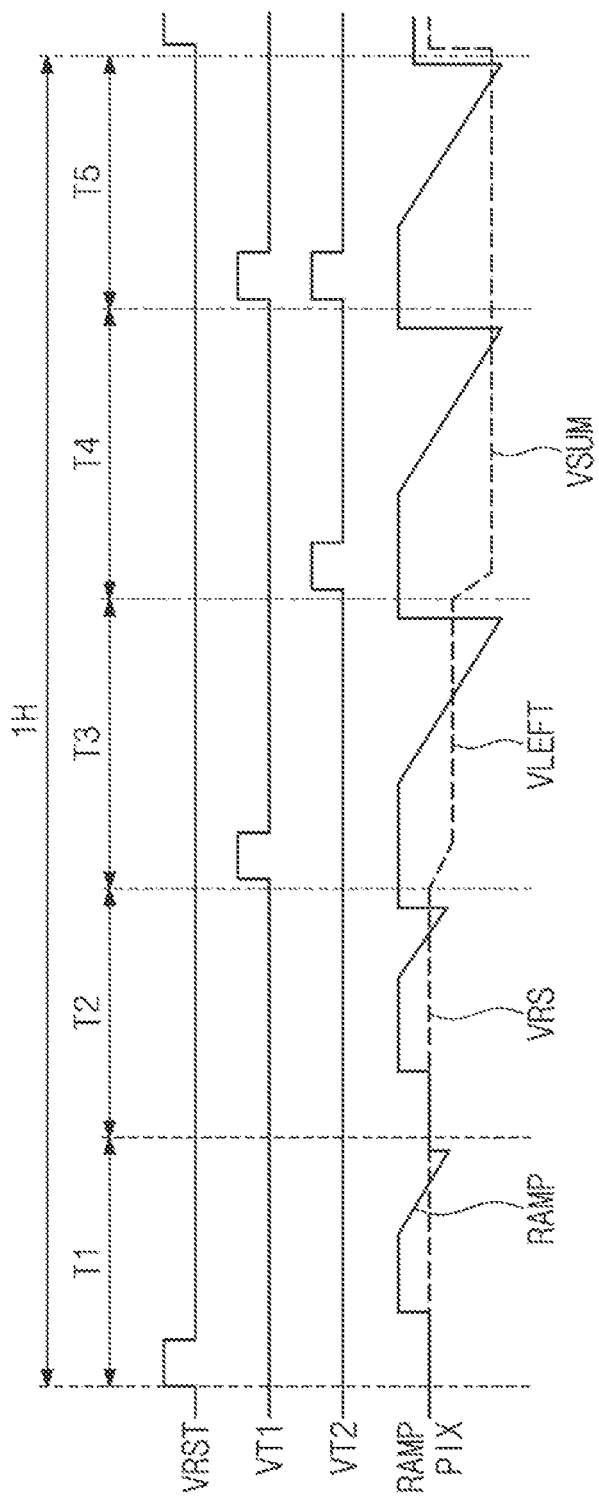
FIG. 5 is a timing diagram illustrating a readout operation of a pixel signal according to an example embodiment.

FIG. 5 is a timing diagram illustrating a readout operation of a pixel signal according to an example embodiment. A time period corresponding to "1H" is illustrated in FIG. 5 and may include period T1 to period T5. Below, the description will be given with reference to FIGS. 2 to 5.

Referring to FIG. 5, an output of the pixel signal PIX may include a reset signal VRS of periods T1 and T2, a left output VLEFT of period T3, and a sum signal VSUM of periods T4 and T5. The reset signal VRS may correspond to an output of the pixel signal PIX when the floating diffusion regions FD1 and FD2 are reset by the operation of the reset transistor RST during periods T1 and T2. The reset transistor RST may be turned on in response to the reset control signal VRST of a high level.

The left output VLEFT may correspond to an output of the pixel signal PIX when the charges integrated by the first photoelectric conversion element PD1 are transferred to the floating diffusion regions FD1 and FD2 by the operation of the first transfer transistor Tx1 during period T3. The sum signal VSUM may correspond to an output of the pixel signal PIX when the charges integrated by the first and second photoelectric conversion elements PD1 and PD2 are transferred to the floating diffusion regions FD1 and FD2 by the operations of the first and second transfer transistors Tx1 and Tx2 during periods T4 and T5. The transfer transistors Tx1 and Tx2 may be turned on in response to the transfer signals VT1 and VT2 of the high level.

Also, according to an example embodiment, during period T3, a right output VRIGHT that is an output of the pixel signal PIX when the charges integrated by the second photoelectric conversion element PD2 are transferred to the floating diffusion regions FD1 and FD2 by the operation of the second transfer transistor Tx2 may be used instead of the left output VLEFT In this regard, the transmission signal VT1 may be the high level before the transmission signal VT2 be the high level, and the transmission signal VT2 may be the high level before the transmission signal VT1 be the high level. Below, for clearness of description, it is assumed that the left output VLEFT is used during period T3 as illustrated in FIG. 5.

The sum signal VSUM may correspond to the total amount of light received by the first and second photoelectric conversion elements PD1 and PD2, and a difference between the sum signal VSUM and the reset signal VRS (i.e., (VSUM-VRS)) may be sum data used to obtain the image data IDAT (refer to FIG. 2). The left output VLEFT may correspond to the amount of light received by the first photoelectric conversion element PD1, and a difference between the left output VLEFT and the reset signal VRS (i.e., (VLEFT-VRS)) may be difference data that may be used as the auto focusing data. For example, the image signal processor 18 (refer to FIG. 1) connected to the image sensor 100 may calculate a time difference (or parallax) and a focal length based on the auto focusing data, and may perform auto focusing based on the time difference and the focal length.

As illustrated in FIG. 5, the image sensor 100 may sample the reset signal VRS two times in periods T1 and T2 (i.e., may compare the ramp signal RAMP and the reset signal VRS two times), may sample the left output VLEFT once in period T3 (i.e., may compare the ramp signal RAMP and the left output VLEFT once), and may sample the sum signal VSUM two times in periods T4 and T5 (i.e., may compare the ramp signal RAMP and the sum signal VSUM two times). The above readout operation is referred to as a "low-noise RSS (Reset-Sig-Sig) readout operation". For example, sampling may be performed based on a point in time when the voltage level of the output of the pixel signal PIX and the voltage level of the ramp signal RAMP become the same. For example, the output of the pixel signal PIX in periods T1 and T2 may correspond to the reset signal VRS. For example, the output of the pixel signal PIX in period T3 may correspond to the left output VLEFT. For example, in periods T4 and T5, the output of the pixel signal PIX may correspond to the sum signal VSUM.

Through the low-noise RSS readout operation, the image sensor 100 may reduce the noise of the sum data and may reduce a time necessary for generating the difference data. In this regard, through the low-noise RSS readout operation, the image sensor 100 may generate the image data IDAT whose noise is reduced and may perform the auto focusing function quickly, and thus, the frame rate may increase.

According to the above low-noise RSS readout operation, the image sensor 100 calculates a difference between a sum of two sum signals and a sum of two reset signals when generating the sum data, and calculates a difference between one left output and one reset signal when generating the difference data. Accordingly, to generate a digital signal, the counter CNT may require both a value of one reset signal and a value of a sum of two reset signals. To this end, the counter CNT may individually include a latch for storing a value of one reset signal and a latch for storing a value of a sum of two reset signals. However, because two reset signals have almost the same value, a value of one reset signal may be obtained by halving a value of a sum of two reset signals.

In an example embodiment, a value of one reset signal may be calculated by shifting a value of a sum of two reset signals.

Accordingly, the counter CNT according to an example embodiment may include a single latch for storing a value of a sum of two reset signals and may be configured to shift the stored sum value when a value of one reset signal is required. Below, a configuration and an operation of the counter CNT will be described with reference to FIGS. 6 to 8.

Figure 6:
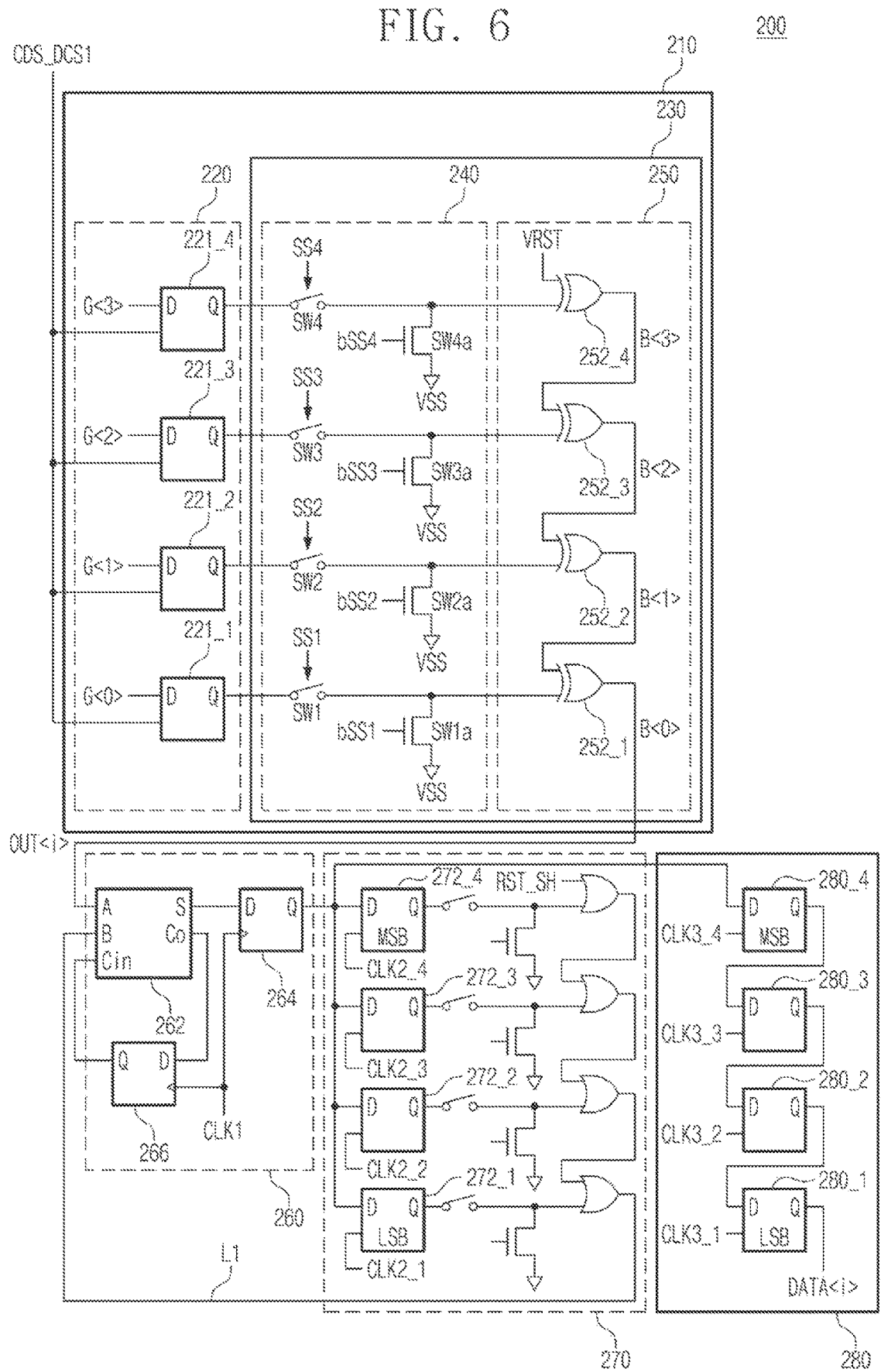
FIG. 6 illustrates configuration of a counter of FIG. 2 according to an example embodiment.

FIG. 6 illustrates configuration of the counter CNT of FIG. 2 according to an example embodiment. Referring to FIG. 6, a counter 200 may include a gray code to binary code (G2B) converter 210, a serial binary adder 260, a reset memory circuit 270, and an output memory circuit 280. The counter CNT may receive a comparison signal (e.g., a first comparison signal CDS_DCS1) from the comparator COMP connected thereto and may count pulses of the comparison signal based on the counting code CCD so as to be output as a digital signal DATA<i>.

The G2B converter 210 may include a first group of switches SW1 to SW4 and SW1a to SW4a, may output an LSB B<0> of a parallel binary code B<0> to B<3> while converting a parallel output gray code G<0> to G<3> latched by parallel-in to parallel-out (PIPO) latches 221_1 to 221_4 into the parallel binary code B<0> to B<3>, and may sequentially output the remaining bits (i.e., from B<1> being a next bit of the LSB G<0> to B<3> being an MSB) of the parallel binary code B<0> to B<3> other than the LSB B<0> one by one to the serial binary adder 260 while changing the arrangement of the first group of switches SW1 to SW4 and SW1a to SW4a. Herein, the arrangement of switches indicates that the switches SW1 to SW4 and SW1a to SW4a are turned on or turned off depending on levels of switch signals SS1 to SS4 and bSS1 to bSS4 corresponding thereto. In this regard, the G2B converter 210 may sequentially output the LSB B<0> to the MSB B<3> of the parallel binary code B<0> to B<3> corresponding to the parallel input gray code G<0> to G<3> one by one by using the first group of switches SW1 to SW4 and SW1a to SW4a.

The G2B converter 210 may include a parallel-in to parallel-out (PIPO) circuit 220 and a parallel-in to serial-out (PISO) circuit 230, and the PIPO circuit 220 may include the PIPO latches 221_1 to 221_4 that receive and latch the parallel input gray code G<0> to G<3> in response to the first comparison signal CDS_DCS1 so as to output the parallel output gray code G<0> to G<3>. The PISO circuit 230 may include a first switch circuit 240 and an XOR circuit 250.

The first switch circuit 240 may include the first group of switches SW1 to SW4 and SW1a to SW4a. For example, each of the first-group switches SW1 to SW4 and SW1a to SW4a may be implemented with an NMOS transistor. The first switch SW1 of the first group is connected between the output terminal "Q" of the first latch 221_1 and the second input terminal of a first XOR gate 252_1, and the fifth switch SW1a of the first group is connected between the second input terminal of the first XOR gate 252_1 and a ground VSS. The second switch SW2 of the first group is connected between the output terminal "Q" of the second latch 221_2 and the second input terminal of a second XOR gate 252_2, and the sixth switch SW2a of the first group is connected between the second input terminal of the second XOR gate 252_2 and the ground VSS. The third switch SW3 of the first group is connected between the output terminal "Q" of the third latch 221_3 and the second input terminal of a third XOR gate 252_3, and the seventh switch SW3a of the first group is connected between the second input terminal of the third XOR gate 252_3 and the ground VSS. The fourth switch SW4 of the first group is connected between the output terminal "Q" of the fourth latch 221_4 and the second input terminal of a fourth XOR gate 252_4, and the eighth switch SW4a of the first group is connected between the second input terminal of the fourth XOR gate 252_4 and the ground VSS.

The XOR circuit 250 may output the parallel binary code B<0> to B<3> as output signals OUT<0> to OUT<3> to a full adder 262. The XOR circuit 250 may include the plurality of XOR gates 252_1 to 252_4. For example, each of the plurality of XOR gates 252_1 to 252_4 may be a XOR gate having two inputs and one output. The first input terminal of the fourth XOR gate 252_4 receives the reset control signal VRST, and the output terminal of the fourth XOR gate 252_4 is connected to the first input terminal of a next-stage XOR gate (e.g., the third XOR gate 252_3). For example, when the image sensor 100 (refer to FIG. 2) performs the reset sampling operation of comparing the reset signal of the pixel signal with the ramp signal RAMP, the reset control signal VRST may be at the high level. When the image sensor 100 (refer to FIG. 2) performs the signal sampling operation of comparing the image signal of the pixel signal with the ramp signal RAMP, the reset control signal VRST may be at the low level.

The output terminal of the third XOR gate 252_3 is connected to the first input terminal of a next-stage XOR gate (i.e., the second XOR gate 252_2), the output terminal of the second XOR gate 252_2 is connected to the first input terminal of a next-stage XOR gate (i.e., the first XOR gate 252_1), and the output terminal of the first XOR gate 252_1 is connected to a first input terminal "A" of the full adder 262. Whenever the arrangement of the first group of switches is changed, the first XOR gate 252_1 may sequentially output the signals B<0>, B<1>, B<2>, and B<3> of the parallel binary code B<0> to B<3> one by one.

The serial binary adder 260 may include the full adder 262, a first flip-flop 264, and a second flip-flop 266. The serial binary adder 260 may perform addition on a 1-bit signal input to the first input terminal "A" and a 1-bit signal input to a second input terminal "B". For example, the serial binary adder 260 may perform an operation of adding a serial binary code generated in the signal sampling operation and a serial binary code generated in the reset sampling operation.

The full adder 262 may include the first input terminal "A" connected to the output terminal of the first XOR gate 252_1, the second input terminal "B" receiving an output signal of the reset memory circuit 270 directly or through a transmission line L1, a carry-in terminal Cin, a carry-out terminal Co, and a sum terminal "S".

The first flip-flop 264 may latch an output signal of the sum terminal "S" of the full adder 262 in response to a rising edge of a first clock signal CLK1 and may output the latched output signal to the reset memory circuit 270. The second flip-flop 266 may latch an output signal of the carry-out terminal Co of the full adder 262 in response to the rising edge of the first clock signal CLK1 and may transfer (or feed back) the latched output signal to the carry-in terminal Cin of the full adder 262. For example, each of the flip-flops 264 and 266 may be implemented with a D-flip-flop, but the present disclosure is not limited thereto.

The reset memory circuit 270 may store a value of the reset signal VRS of FIG. 5. In detail, the reset memory circuit 270 may store a value of a sum of two reset signals. In the case of generating the sum data described with reference to FIG. 5, the reset memory circuit 270 may use the stored sum value without being modified. In the case of generating the difference data described with reference to FIG. 5, the reset memory circuit 270 may use a value of one reset signal calculated by shifting the sum value in response to a reset shifting signal RST_SH of the high level. The output memory circuit 280 may store a value of the digital signal DATA<i> to be finally output. For example, the digital signal DATA<i> may be one of the sum data or the difference data. The reset memory circuit 270 may include a plurality of latches 272_1 to 272_4, and the output memory circuit 280 may include a plurality of latches 280_1 to 280_4.

Figure 7:
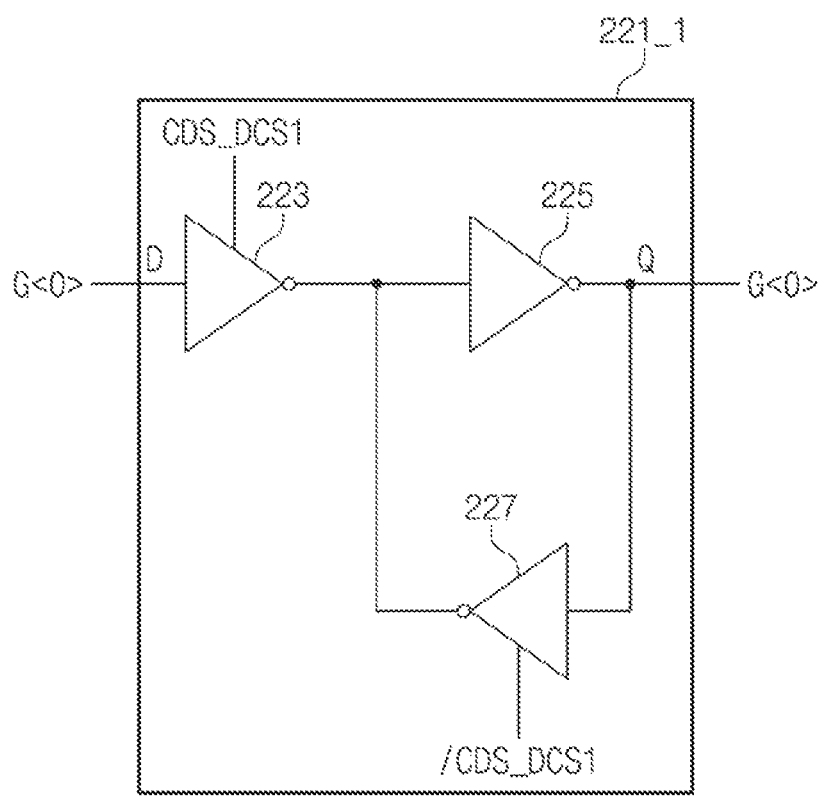
FIG. 7 is a circuit diagram illustrating one of PIPO latches of FIG. 6 according to an example embodiment.

FIG. 7 is a circuit diagram illustrating the PIPO latche 221_1 of FIG. 6. Because the PIPO latches 221_1 to 221_4 have the same structure and perform the same operation, the structure and operation of the first latch 221_1 will be representatively described with reference to FIGS. 6 and 7. Referring to FIG. 7, the first latch 221_1 may include a first tri-state inverter 233, an inverter 225, and a second tri-state inverter 227.

The input terminal of the first tri-state inverter 233 is connected to an input terminal "D" of the first latch 221_1 receiving a first input gray signal G<0>. The input terminal of the inverter 225 is connected to the output terminal of the first tri-state inverter 233, and the output terminal of the inverter 225 is connected to the output terminal of the first latch 221_1 of outputting a first output gray signal G<0>. The input terminal of the second tri-state inverter 227 is connected to the output terminal "Q" of the first latch 221_1, and the output terminal of the second tri-state inverter 227 is connected to the input terminal of the inverter 225.

Because a first inverted comparison signal /CDS_DCS1 is at the low level when the first comparison signal CDS_DCS1 output from the comparator COMP (refer to FIG. 2) is at the high level, the first tri-state inverter 233 is enabled, and the second tri-state inverter 227 is disabled. Accordingly, the first latch 221_1 may output the first input gray signal G<0>.

However, because the first inverted comparison signal /CDS_DCS1 is at the high level when the first comparison signal CDS_DCS1 output from the comparator COMP (refer to FIG. 2) is at the low level, the first tri-state inverter 233 is disabled, and the second tri-state inverter 227 is enabled. Accordingly, the first input gray signal G<0> may be maintained by the inverter 225 and the second tri-state inverter 227 without being modified.

The latches 272_1 to 272_4 and 280_1 to 280_4 of the reset memory circuit 270 and the output memory circuit 280 have the same structure of the first latch 221_1 described above. For example, clock signals CLK2_1 and CLK3_1 may be respectively input to control terminals of the first tri-state inverters of the latches 272_1 and 280_1, and inverse clock signals /CLK2_1 and /CLK3_1 may be respectively input to control terminals of the second tri-state inverters of the latches 272_1 and 280_1. Also, clock signals CLK2_4 and CLK3_4 may be respectively input to control terminals of the first tri-state inverters of the latches 272_4 and 280_4, and inverse clock signals /CLK2_4 and /CLK3_4 may be respectively input to control terminals of the second tri-state inverters of the latches 272_4 and 280_4.

Figure 8:
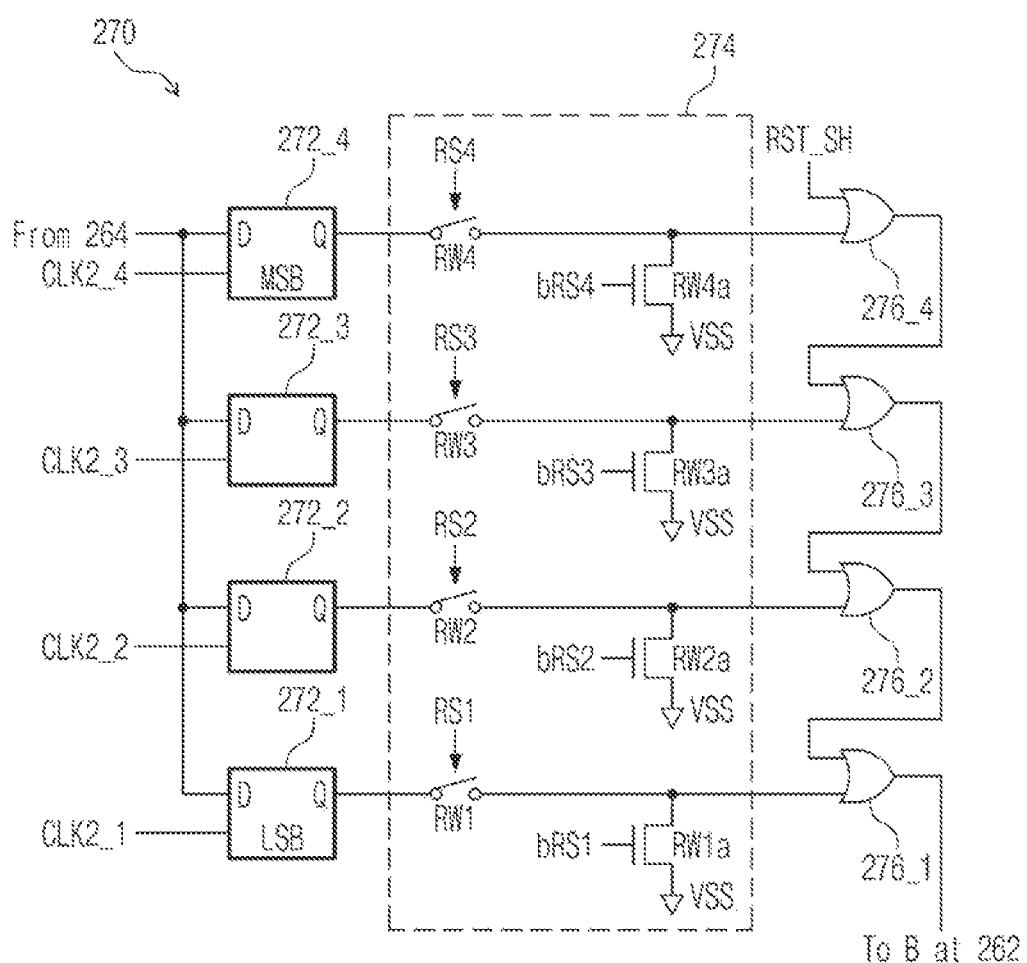
FIG. 8 is a circuit diagram illustrating a reset memory circuit of FIG. 6 according to an example embodiment.

FIG. 8 is a circuit diagram illustrating the reset memory circuit 270 of FIG. 6. Referring to FIGS. 6 and 8, the reset memory circuit 270 may include the plurality of latches 272_1 to 272_4, a second switch circuit 274, and a plurality of OR gates 276_1 to 276_4. As described with reference to FIG. 6, the reset memory circuit 270 may store a value of a sum of two reset signals and may calculate a half of the sum value (i.e., may calculate a value of one reset signal) by shifting the sum value in response to the reset shifting signal RST_SH of the high level.

The latches 272_1 to 272_4 may latch the output signal of the first flip-flop 264 in response to the clock signals CLK2_1 to CLK2_4. As described above, each of the latches 272_1 to 272_4 have the same structure of the first latch 221_1.

The second switch circuit 274 may include a second group of switches RW1 to RW4 and RW1a to RW4a. For example, each of the second-group switches RW1 to RW4 and RW1a to RW4a may be implemented with an NMOS transistor. The first switch RW1 of the second group is connected between the output terminal "Q" of the first latch 272_1 and the second input terminal of the first OR gate 276_1, and the fifth switch RW1a of the second group is connected between the second input terminal of the first OR gate 276_1 and the ground VSS. The second switch RW2 of the second group is connected between the output terminal "Q" of the second latch 272_2 and the second input terminal of the second OR gate 276_2, and the sixth switch RW2a of the second group is connected between the second input terminal of the second OR gate 276_2 and the ground VSS. The third switch RW3 of the second group is connected between the output terminal "Q" of the third latch 272_3 and the second input terminal of the third OR gate 276_3, and the seventh switch RW3a of the second group is connected between the second input terminal of the third OR gate 276_3 and the ground VSS. The fourth switch RW4 of the second group is connected between the output terminal "Q" of the fourth latch 272_4 and the second input terminal of the fourth OR gate 276_4, and the eighth switch RW4a of the second group is connected between the second input terminal of the fourth OR gate 276_4 and the ground VSS.

For example, each of the OR gates 276_1 to 276_4 may be an OR gate having two inputs and one output. The output terminals of the remaining series-connected OR gates 276_2 to 276_4 other than the first OR gate 276_1 are respectively connected to first input terminals of next-stage OR gates (i.e., the OR gates 276_1 to 276_3). The output terminal of the fourth OR gate 276_4 is connected to the first input terminal of the third OR gate 276_3, the output terminal of the third OR gate 276_3 is connected to the first input terminal of the second OR gate 276_2, the output terminal of the second OR gate 276_2 is connected to the first input terminal of th first OR gate 276_1, and the output terminal of the first OR gate 276_1 is connected to the second input terminal "B" of the full adder 262. The first input terminal of the fourth OR gate 276_4 may receive the reset shifting signal RST_SH.

FIGS. 9A and 9B are timing diagrams illustrating an operation of the counter 200 of FIG. 6. In FIGS. 9A and 9B, periods T1 to T5 may correspond to periods T1 to T5 of FIG. 5. Below, the description will be given with reference to FIGS. 5 and 8 together with FIGS. 9A and 9B.

Comparison results of the reset signal VRS and the ramp signal RAMP in period T1 and period T2 may be latched by the PIPO circuit 220 through a gray code latch operation as a first reset gray code $RST1_G$ (=G<3>G<2>G<1>G<0>=0110) and a second reset gray code $RST2_G$ (=G<3>G<2>G<1>G<0>=0110). Because the reset control signal VRST is at the high level during the reset sampling operation, the first reset gray code $RST1_G$ and the second reset gray code $RST2_G$ may be converted into a first reset binary code $RST1_B$ (=B<3>B<2>B<1>B<0>=1011) and a second binary code $RST2_B$ (=B<3>B<2>B<1>B<0>=1011) by the XOR circuit 250.

A comparison result of the left output VLEFT and the ramp signal RAMP in period T3 may be latched by the PIPO circuit 220 as a left gray code LEFTG (=G<3>G<2>G<1>G<0>=0100) through the gray code latch operation.

Comparison results of the sum signal VSUM and the ramp signal RAMP in period T4 and period T5 may be latched by the PIPO circuit 220 through the gray code latch operation as a first sum gray code $SUM1_G$ (=G<3>G<2>G<1>G<0>=1110) and a second sum gray code $SUM2_G$ (=G<3>G<2>G<1>G<0>=1110).

Because the reset control signal VRST is at the low level during the signal sampling operation, the left gray code LEFTG, the first sum gray code $SUM1_G$, and the second sum gray code $SUM2_G$ may be converted into a left binary code $LEFT_B$ (=B<3>B<2>B<1>B<0>=0111), a first sum binary code $SUM1_B$ (=B<3>B<2>B<1>B<0>=1011), and a second sum binary code $SUM2_B$ (=B<3>B<2>B<1>B<0>=1011) by the XOR circuit 250.

As described above, after a gray code is converted into a binary code, the switch arrangement of the first-group switches SW1 to SW4 and SW1a to SW4a is sequentially changed depending on the switch signals SS1 to SS4 and bSS1 to bSS4, the binary code signals B<3>, B<2>, B<1>, and B<0> may be output to the full adder 262 one by one (i.e., from the LSB B<0> to the MSB B<3>) (OUT<i>=B<i>).

Referring to FIGS. 9A and 9B, the first reset binary code $RST1_B$ (=1011) whose signals are sequentially output after period T1 is latched by the latches 272_1 to 272_4 of the reset memory circuit 270 depending on the clock signals CLK2_1 to CLK2_4, and a sum ($RST1_B$+$RST2_B$)=(=1011+1011=0110) of the first reset binary code $RST1_B$ (=1011) and the second reset binary code $RST2_B$ (=1011) output after period T2 is latched by the latches 272_1 to 272_4 of the reset memory circuit 270 depending on the clock signals CLK2_1 to CLK2_4. That is, the reset memory circuit 270 according to an example embodiment may store a sum value (i.e., corresponding to the value of ($RST1_B$+$RST2_B$)) of two reset signals after two reset sampling operations ends.

When the shifting operation for the value stored in the reset memory circuit 270 is not required, the switch arrangement of the second-group switches RW1 to RW4 and RW1a to RW4a may be sequentially changed depending on the switch signals RS1 to RS4 and bRS1 to bRS4 such that the values latched by the latches 272_1 to 272_4 are sequentially output one by one (i.e., from the LSB to the MSB). However, when the shifting operation for the value stored in the reset memory circuit 270 is required, the shifting operation may be performed in response to the reset shifting signal RST_SH of the high level. In this case, some of the values stored in the latches 272_1 to 272_4 may not be used.

In detail, in the case of calculating a value (i.e., 0011) of "($RST1_B$+$RST2_B$)/2" through the shifting of the value of "$RST1_B$+$RST2_B$", because the LSB (i.e., 0) of "$RST1_B$+$RST2_B$" (i.e., 0110) present in the latch 272_1 is not used and only the values (i.e., 0, 1, and 1) present in the latches 272_2 to 272_4 are used, the first switch RW1 of the second group connected to the latch 272_1 may be turned off in response to the switch signal RS1 maintained at the low level. Instead, the fourth OR gate 276_4 may receive the reset shifting signal RST_SH of the high level, and the shifted value may be sequentially output one by one through the first OR gate 276_1 (e.g., in the case of "($RST1_B$+$RST2_B$)/2", 1, 1, 0, and 0 from the LSB to the MSB).

The serial binary adder 260 may generate an addition result by adding each signal of the binary code (e.g., LEFT$_B$ or (SUM1$_B$+SUM2$_B$)) output one by one in units of bit from the first XOR gate 252_1 and each signal of the binary code (e.g., (RST1$_B$+RST2$_B$)/2 or (RST1$_B$+RST2$_B$)) output one by one from the first OR gate 276_1 in units of bit. The serial binary adder 260 latches the addition result (e.g., (RST1$_B$+RST2$_B$)/2+LEFT$_B$=0011+0111=0010 or RST1$_B$+RST2$_B$+SUM1$_B$+SUM2$_B$=0110+1011+1011=1100) to each latches 280_1 to 280_4 of the output memory circuit 280 using clock signals CLK3_1 to CLK3_4.

When each of the clock signals CLK3_1 to CLK3_4 is at the low level, the latch 280_1 may output the first signal DATA<0> of the added result. When the second clock signal CLK3_2 transitions from the low level to the high level, the latch 280_1 may output the second signal DATA<1> of the added result latched in the latch 280_2. When the third clock signal CLK3_3 transitions from the low level to the high level, the latch 280_1 may output the third signal DATA<2> of the added result latched in the latch 280_3. When the fourth clock signal CLK3_4 transitions from the low level to the high level, the latch 280_1 may sequentially output the fourth signal DATA<3> of the added result latched in the latch 280_4 one by one. For example, the value of "(RST1$_B$+RST2$_B$)/2+LEFT$_B$" may be used to generate the auto focusing data, and the value of "RST1$_B$+RST2$_B$+SUM1$_B$+SUM2$_B$" may be used to generate image data.

The low-noise RSS readout operation of the image sensor 100 (refer to FIG. 2) and the configuration and operation of the counter 200 (refer to FIG. 6) have been described with reference to FIGS. 5 to 8 and FIGS. 9A and 9B. As the counter 200 according to an example embodiment performs the shifting operation, the counter 200 may use both a value of one reset signal and a value of two reset signals only by using one reset memory circuit 270. Because only one reset memory circuit 270 is included, the area of the counter 200 may be minimized.

However, the present disclosure is not limited thereto. For example, the low-noise RSS readout operation may include a process of sampling the reset signal VRS and the sum signal VSUM N times (e.g., three or more times), and the shifting operation of the counter 200 may change depending on the number of times of sampling of the reset signal VRS and the sum signal VSUM. For example, the timing controller 160 of FIG. 2 may include a register for adjusting the number of times of sampling necessary in the low-noise RSS readout operation. Also, as described above, the right output VRIGHT may be sampled instead of the left output VLEFT.

Figure 10:
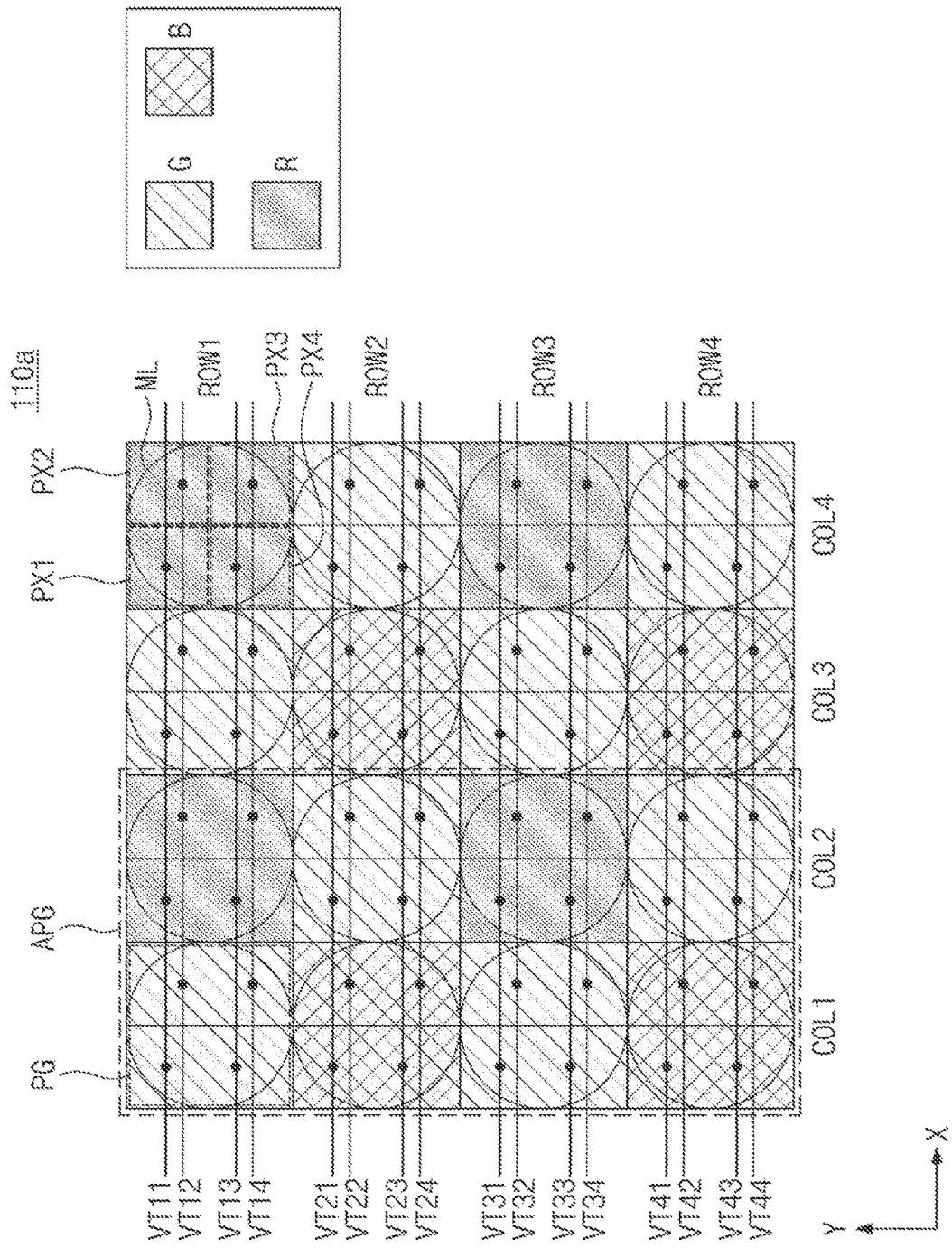
FIG. 10 illustrates configuration of a pixel array of FIG. 2 according to an example embodiment.

FIG. 10 illustrates another example of a configuration of the pixel array 110 of FIG. 2. Referring to FIG. 10, each of a plurality of pixel groups PG of a pixel array 110a may include a micro lens ML and four pixels PX1, PX2, PX3, and PX4. For example, in the pixel group PG, the first pixel PX1 may be disposed on the left top, the second pixel PX2 may be disposed on the right top, the third pixel PX3 may be disposed on the left bottom, and the fourth pixel PX4 may be disposed on the right bottom. In this regard, the first pixel PX1 and the second pixel PX2 may be disposed side by side in the X-axis direction, the third pixel PX3 and the fourth pixel PX4 may be disposed side by side in the X-axis direction, the first pixel PX1 and the third pixel PX3 may be disposed side by side in the Y-axis direction, and the second pixel PX2 and the fourth pixel PX4 may be disposed side by side in the Y-axis direction.

The first to fourth pixels PX1 to PX4 may include first to fourth photoelectric conversion elements PD1 to PD4 (refer to FIG. 11), respectively. The plurality of first pixels PX1 may operate in response to a plurality of first transfer signals VT11, VT21, VT31, and VT41. The plurality of second pixels PX2 may operate in response to a plurality of second transfer signals VT12, VT22, VT32, and VT42. The plurality of third pixels PX3 may operate in response to a plurality of third transfer signals VT13, VT23, VT33, and VT43. The plurality of fourth pixels PX4 may operate in response to a plurality of fourth transfer signals VT14, VT24, VT34, and VT44. For example, pixel signals generated from the first pixels PX1 and the third pixels PX3 or pixel signals generated from the second pixels PX2 and the fourth pixels PX4 may be used to generate the auto focusing data, and a sum pixel signal generated from the first to fourth pixels PX1 to PX4 may be used to generate frame-based image data.

For example, in the case of the pixel array 110a of FIG. 10, an output of a pixel signal based on charges integrated by the photoelectric conversion elements PD1 and PD3 (refer to FIG. 11) of the first pixels PX1 and the third pixels PX3 may be used as the left output VLEFT, and an output of a pixel signal based on charges integrated by the photoelectric conversion elements PD1 to PD4 (refer to FIG. 11) of the first to fourth pixels PX1 to PX4 may be used as the sum signal VSUM.

In addition, like the pixel array 110 of FIG. 3, the pixel array 110a of FIG. 10 may be divided into a plurality of auto focusing pixel groups APG, and an operation of the auto focusing pixel group APG is the same as that described with reference to FIG. 3 except that one pixel group includes four pixels. Thus, additional description will be omitted to avoid redundancy.

Figure 11:
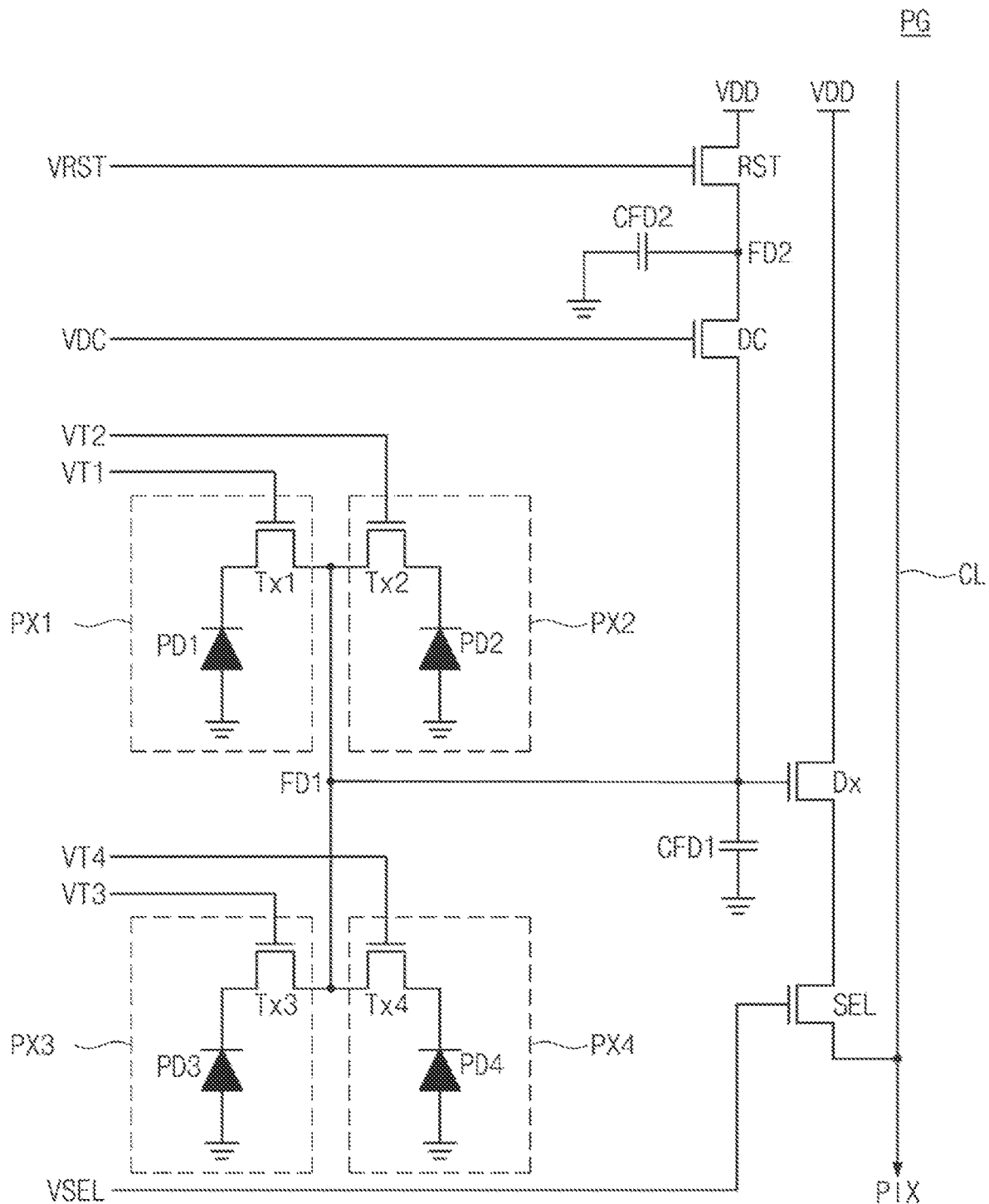
FIG. 11 is a circuit diagram illustrating a pixel group of a pixel array of FIG. 10 according to an example embodiment.

FIG. 11 is a circuit diagram illustrating the pixel group PG of the pixel array 110a of FIG. 10. Referring to FIG. 11, the pixel group PG may include the pixels PX1 to PX4, the photoelectric conversion elements PD1 to PD4, transfer transistors Tx1 to Tx4, the reset transistor RST, the dual conversion transistor DC, the drive transistor Dx, and the select transistor SEL. A configuration and an operation of the pixel group PG of FIG. 11 are the same as the configuration and the operation of the pixel group PG of FIG. 4 except for the number of pixels, the number of photoelectric conversion elements, and the number of transfer transistors, and thus, additional description will be omitted to avoid redundancy.

Figure 12:
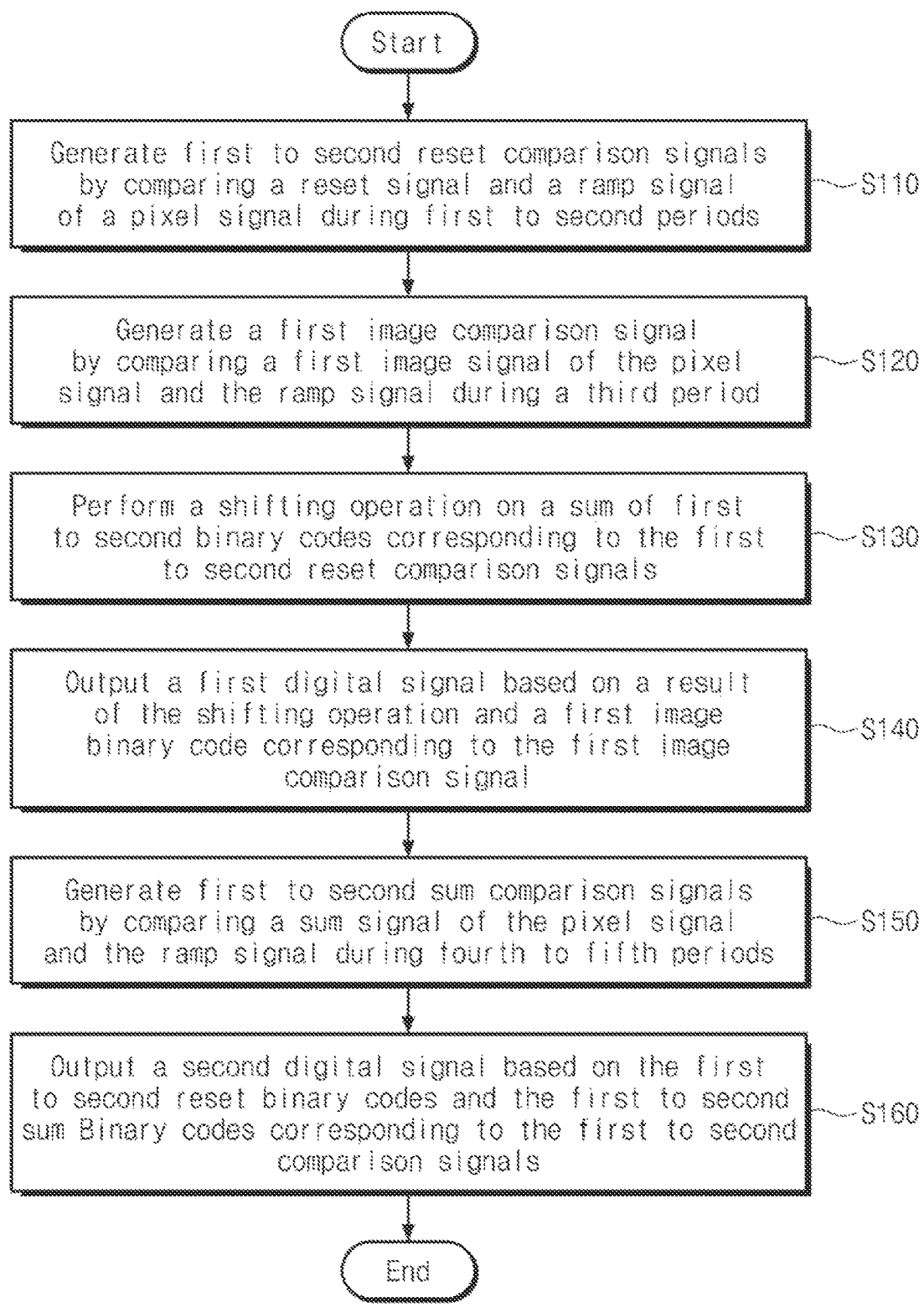
FIG. 12 is a flowchart illustrating an operation method of an image sensor according to an example embodiment.

FIG. 12 is a flowchart illustrating an example of an operation method of an image sensor according to an example embodiment. Below, FIG. 12 will be described with reference to FIGS. 2 to 8 together.

In operation S1101, the comparator COMP of the ADC circuit 150 may generate first and second reset comparison signals by comparing a reset signal of the pixel signal PIX the ramp signal RAMP two times in first to second periods illustrated in FIG. 5. In operation S120, the comparator COMP of the ADC circuit 150 may generate a first image comparison signal by comparing a first image signal of the pixel signal PIX in a third period illustrated in FIG. 5 (e.g., a first pixel signal output from the first pixel PX1 in FIG. 3) with the ramp signal RAMP.

In operation S1301, the counter CNT of the ADC circuit 150 may convert the first to second reset comparison signals into first to second binary codes, and the reset memory circuit 270 may perform the shifting operation on a sum of the first and second binary codes in response to the reset shifting signal of the high level. In operation S140, the counter CNT of the ADC circuit 150 may output a first digital signal based on a result of the shifting operation (e.g., a value of the first reset binary code) and the first image binary code corresponding to the first image comparison signal (e.g., may output the first digital signal by adding the first reset binary code and the first image binary code). Herein, the first digital signal may be used as the auto focusing data.

In operation S150, the comparator COMP of the ADC circuit 150 may generate first and second sum comparison signals by comparing a sum signal of the pixel signal PIX with the ramp signal RAMP in fourth and fifth periods illustrated in FIG. 5. In operation S160, the counter CNT of the ADC circuit 150 may output a second digital signal based on the first and second reset binary codes and the first and second summed binary codes corresponding to the first and second sum comparison signals (e.g., may output the second digital signal by adding the first and second reset binary codes and the first and second summation binary codes). Herein, the second digital signal may be used as image data.

Figure 13:
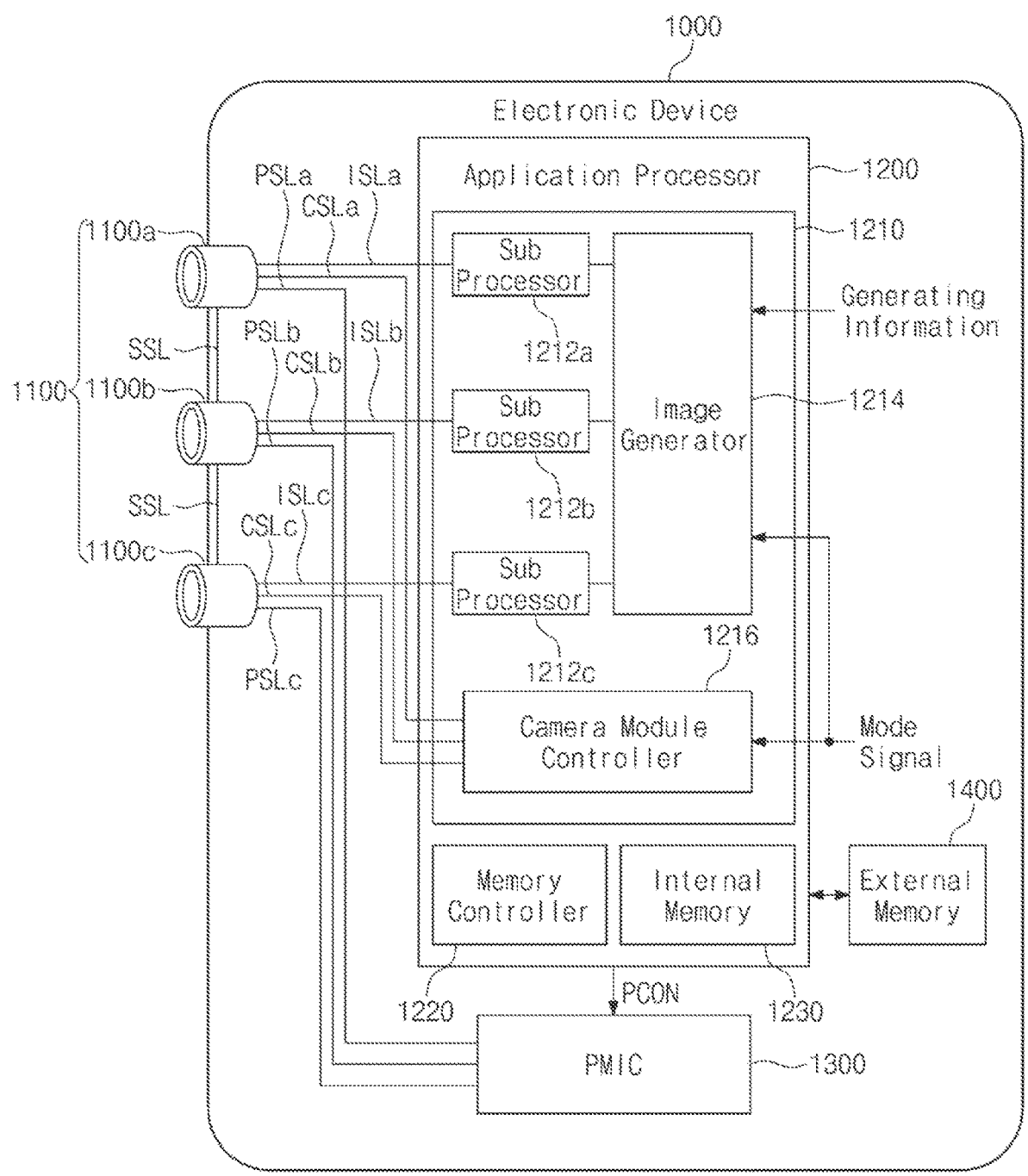
FIG. 13 illustrates configuration of an electronic device including an image sensor according to an example embodiment.
Figure 14:
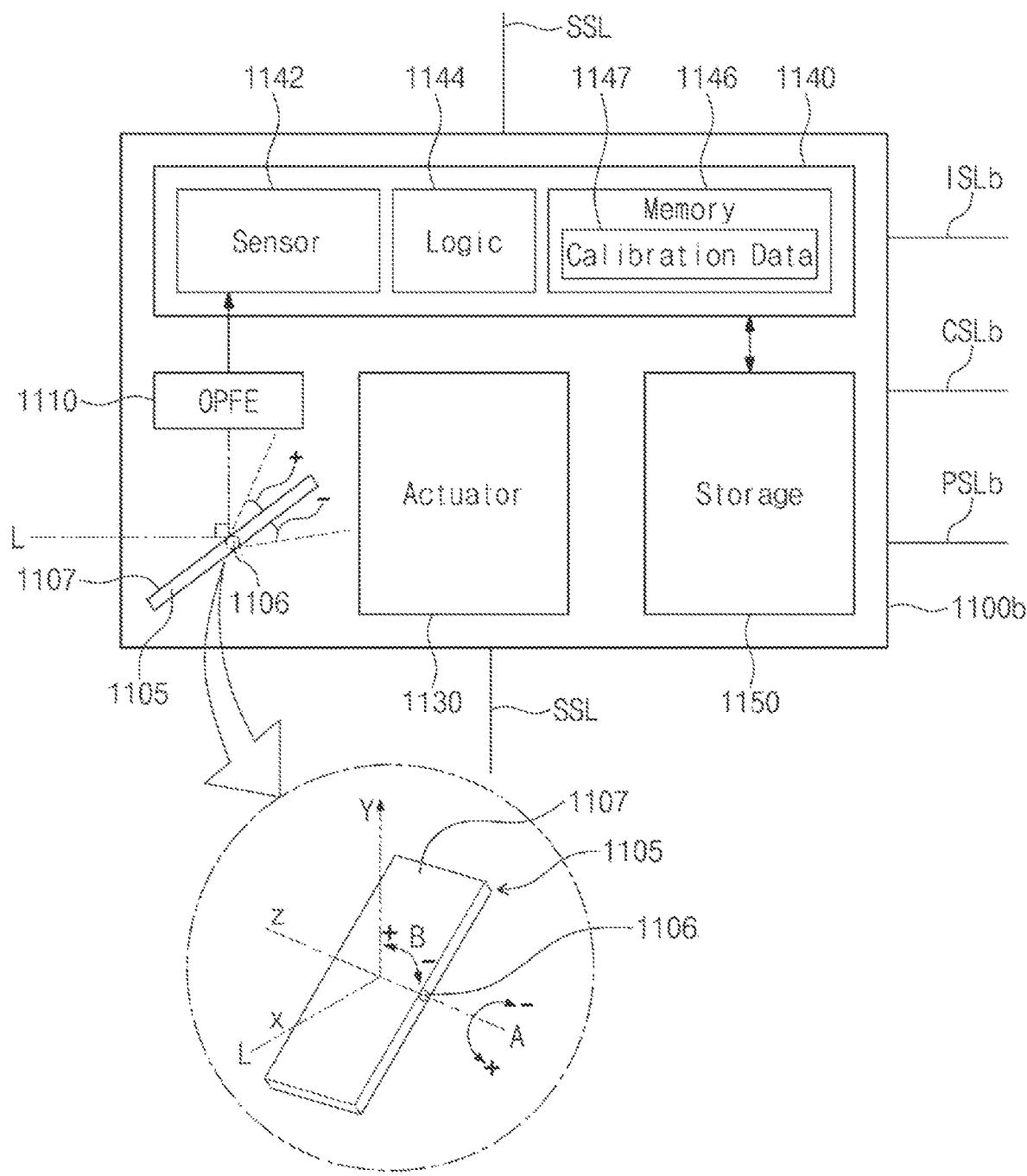
FIG. 14 illustrates configuration of a camera module of FIG. 13 according to an example embodiment.

FIG. 13 is a configuration of an electronic device including an image sensor according to an example embodiment. FIG. 14 is a configuration illustrating a camera module of FIG. 13. Referring to FIG. 13, an electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 13, but the present disclosure is not limited thereto. In some example embodiments, the camera module group 1100 may be modified to include only two camera modules. Also, in some example embodiments, the camera module group 1100 may be modified to include "n" camera modules (n being a natural number of 4 or more).

Below, a detailed configuration of the camera module 1100b will be more fully described with reference to FIG. 14, but the following description may be equally applied to the remaining camera modules 1100a and 1100c.

Referring to FIG. 14, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some example embodiments, the prism 1105 may change a path of the light "L" incident in a first direction (X) to a second direction (Y) perpendicular to the first direction (X), Also, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In some example embodiments, as illustrated in FIG. 14, a maximum rotation angle of the prism 1105 in direction "A" may be equal to or smaller than 15 degrees in a positive A direction and may be greater than 15 degrees in a negative A direction, but the present disclosure is not limited thereto.

In some example embodiments, the prism 1105 may move within approximately 20 degrees in a positive or negative B direction, between 10 degrees and 20 degrees, or between 15 degrees and 20 degrees. The prism 1105 may move at the same angle in the positive or negative B direction or may move at a similar angle within approximately 1 degree.

In some example embodiments, the prism 1105 may move the reflecting plane 1107 of the light reflecting material in the third direction (e.g., Z direction) parallel to a direction in which the central axis 1106 extends.

The OPFE 1110 may include optical lenses composed of "m" groups (m being a natural number), for example. Here, "m" lens may move in the second direction (Y) to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110. The OPFE 1110 may further include an optical lens composed of 'n" groups (n being a natural number) in front of the above-described "m" lens.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. In particular, the image sensor 1142 according to an example embodiment may perform the RSS readout operation to read out a pixel signal. Also, the image sensor 1142 according to an example embodiment may include a counter configured to calculate a value of an individual reset signal by performing the shifting operation on a sum of values of the reset signal. The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some example embodiments, the storage 1150 may be implemented with an electrically erasable programmable read only memory (EEPROM), but the present disclosure is not limited thereto.

Referring together to FIGS. 13 and 14, in some example embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some example embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, the present disclosure is not limited thereto.

In some example embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some example embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, but the present disclosure is not limited thereto.

Also, in some example embodiments, fields of view of the plurality of camera modules 1100a, 1100b, and 1100c may be different. In this case, the plurality of camera modules 1100a, 1100b, and 1100c may include different optical lens, not limited thereto.

In some example embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 16, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present disclosure is not limited thereto.

In some example embodiments, one sub image processor may be disposed to correspond to a plurality of camera modules. For example, the sub image processor 1212a and the sub image processor 1212c may be integrally implemented, not separated from each other as illustrated in FIG. 16. In this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In detail, the image generator 1214 may generate the output image by merging at least a portion of the image data respectively generated from the camera modules 1100a, 1100b, and 1100c having different fields of view, depending on the image generating information Generating Information or the mode signal. Also, the image generator 1214 may generate the output image by selecting one of the image data respectively generated from the camera modules 1100a, 1100b, and 1100c having different fields of view, depending on the image generating information Generating Information or the mode signal.

In some example embodiments, the image generating information Generating Information may include a zoom signal or a zoom factor. Also, in some example embodiments, the mode signal may be, for example, a signal based on a mode selected from a user.

In the case where the image generating information Generating Information is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In some example embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some example embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some example embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. The application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

According to an example embodiment, the area of a counter occupied in an image sensor may be minimized.

Also, according to an example embodiment, through a low-noise RSS readout operation, it may be possible to generate image data whose noise is reduced and to perform an auto focusing function quickly such that a frame rate increases.

While aspects of example embodiments have been particularly shown and described, it will be understood that various changes in form and details may be made therein without departing from the spirit and scope of the following claims.

What is claimed is:

1. A counter which generates a binary code corresponding to a result of comparing a pixel signal output from a plurality of pixel groups of a pixel array with a ramp signal and generates a digital signal corresponding to the pixel signal based on the binary code, the counter comprising:
   a reset memory circuit configured to store a sum of N reset binary codes, each of the N reset binary codes corresponding to a result of comparing a reset signal of the pixel signal with the ramp signal, and to calculate one of the N reset binary codes by performing a shifting operation on the sum of the N reset binary codes; and
   an output memory circuit configured to output the digital signal based on the N reset binary codes, a first image binary code indicating a result of comparing a first image signal of the pixel signal with the ramp signal once, and N sum binary codes, the N sum binary codes respectively indicating N results of comparing a sum signal of the pixel signal with the ramp signal,
   wherein N is an integer of 2 or more, and wherein the first image signal is output from some of pixels in each of the plurality of pixel groups, and the sum signal is output from each of the pixels included in each of the plurality of pixel groups.

2. The counter of claim 1, further comprising:
a parallel-input parallel-output (PIPO) circuit configured to latch a parallel input gray code in response to a result of comparing the pixel signal and the ramp signal, and to output a parallel output gray code;
a parallel-input serial-output (PISO) circuit configured to convert the parallel output gray code into the binary code and to sequentially output a least significant bit of the binary code to a most significant bit of the binary code one by one; and
a serial binary adder circuit configured to add one of the N reset binary codes and the first image binary code, and to add the N reset binary codes and the first to N-th sum binary codes.

3. The counter of claim 2, wherein the PISO circuit comprises:
a plurality of switches; and
a plurality of XOR gates connected in series, each of the plurality of XOR gates comprising an output terminal, a first input terminal, and a second input terminal,
wherein the output terminal of at least two of the plurality of XOR gates is connected to the first input terminal of an XOR gate of a next stage,
wherein the plurality of switches are configured to connect the second input terminals of the plurality of XOR gates to the PIPO circuit in response to switch signals, respectively,
wherein the first input terminal of an XOR gate corresponding to the most significant bit from among the plurality of XOR gates is configured to receive a reset control signal, and
wherein the reset control signal is at a high level while the reset signal and the ramp signal are compared, is at a low level while the first image signal and the ramp signal are compared, and is at the low level while the sum signal and the ramp signal are compared.

4. The counter of claim 2, wherein the serial binary adder circuit comprises:
a full adder circuit comprising a first input terminal, a second input terminal configured to receive an output signal of the reset memory circuit, a carry-in terminal, a carry-out terminal, and a sum terminal;
a first flip-flop configured to output an output signal of the sum terminal to the reset memory circuit; and
a second flip-flop configured to feed an output signal of the carry-out terminal back to the carry-in terminal.

5. The counter of claim 2, wherein the reset memory circuit comprises:
a plurality of latches configured to latch an output signal of the serial binary adder circuit comprises;
a plurality of switches; and
a plurality of OR gates connected in series, each of the plurality of OR gates comprising an output terminal, a first input terminal, and a second input terminal,
wherein the output terminal of at least two of the plurality of OR gates is connected to the first input terminal of an OR gate of a next stage,
wherein the plurality of switches are configured to connect the second input terminals of the plurality of OR gates to output terminals of the plurality of latches, respectively, or to a ground, in response to switch signals,
wherein the first input terminal of an OR gate corresponding to the most significant bit from among the plurality of OR gates is configured to receive a reset shifting signal, and
wherein the output terminal of an OR gate corresponding to the least significant bit from among the plurality of OR gates is connected to the serial binary adder circuit.

6. The counter of claim 5, wherein, while the first image signal and the ramp signal are compared, a switch connected to the OR gate corresponding to the least significant bit from among the plurality of switches is turned off, and the reset memory circuit is configured to perform the shifting operation on the sum of the first to N-th reset binary codes in response to the reset shifting signal of a high level.

7. An image sensor comprising:
a pixel array configured to generate a pixel signal and comprising a plurality of pixel groups, wherein each of the plurality of pixel groups comprises a first pixel comprising a first photoelectric conversion element and a second pixel comprising a second photoelectric conversion element;
a ramp signal generator configured to generate a ramp signal; and
an analog-to-digital converting circuit configured to convert the pixel signal into a digital signal,
wherein the analog-to-digital converting circuit comprises:
a comparator configured to generate a first comparison signal by comparing a reset signal of the pixel signal with the ramp signal in a first period, a second comparison signal by comparing the reset signal of the pixel signal with the ramp signal in a second period, a third comparison signal by comparing a first image signal of the pixel signal with the ramp signal in a third period, a fourth comparison signal by comparing a sum signal of the pixel signal with the ramp signal in a fourth period and a fifth comparison signal by comparing the sum signal of the pixel signal with the ramp signal in a fifth period, wherein the first image signal is based on the first photoelectric conversion element, and the sum signal is based on both the first photoelectric conversion element and the second photoelectric conversion element; and
a counter circuit configured to generate a first binary code corresponding to the first comparison signal and a second binary code corresponding to the second comparison signal, to perform a shifting operation on a sum of a first reset binary code corresponding to the first comparison signal and a second reset binary code corresponding to the second comparison signal, and to generate the digital signal corresponding to the pixel signal based on a result of the shifting operation.

8. The image sensor of claim 7, wherein the counter circuit comprises:
a parallel-input parallel-output (PIPO) circuit configured to latch a parallel input gray code in response to the first comparison signal and the second comparison signal, and to output a parallel output gray code;
a parallel-input serial-output (PISO) circuit configured to convert the parallel output gray code into a binary code and to sequentially output a least significant bit of the binary code to a most significant bit of the binary code one by one;
a serial binary adder circuit configured to add the result of the shifting operation and a first image binary code corresponding to the third comparison signal, and to add the first reset binary code, the second reset binary code, a first sum code corresponding to the fourth comparison signal and a second sum code corresponding to the fifth comparison signal;

a reset memory circuit configured to store a sum of the first reset binary code and the second reset binary code, and to control the shifting operation to be performed in response to a reset shifting signal; and an output memory circuit configured to output an output of the serial binary adder circuit as the digital signal.

9. The image sensor of claim 8, wherein the PISO circuit comprises:
a plurality of switches; and
a plurality of XOR gates connected in series, each of the plurality of XOR gates comprising an output terminal, a first input terminal, and a second input terminal,
wherein the output terminal of at least two of the plurality of XOR gates is connected to the first input terminal of an XOR gate of a next stage,
wherein the plurality of switches are configured to connect the second input terminals of the plurality of XOR gates to the PIPO circuit in response to switch signals, respectively,
wherein the first input terminal of an XOR gate corresponding to the most significant bit from among the plurality of XOR gates is configured to receive a reset control signal, and
wherein the reset control signal is at a high level during the first and second periods, and is at a low level during the third to fifth periods.

10. The image sensor of claim 8, wherein the serial binary adder circuit comprises:
a full adder circuit comprising a first input terminal, a second input terminal configured to receive an output signal of the reset memory circuit, a carry-in terminal, a carry-out terminal, and a sum terminal;
a first flip-flop configured to output an output signal of the sum terminal to the reset memory circuit; and
a second flip-flop configured to feed an output signal of the carry-out terminal back to the carry-in terminal.

11. The image sensor of claim 8, wherein the reset memory circuit comprises:
a plurality of latches configured to latch an output signal of the serial binary adder circuit;
a plurality of switches; and
a plurality of OR gates connected in series, each of the plurality of OR gates comprising an output terminal, a first input terminal, and a second input terminal,
wherein the output terminal of at least two of the plurality of OR gates is connected to the first input terminal of an OR gate of a next stage,
wherein the plurality of switches are configured to connect the second input terminals of the plurality of OR gates to output terminals of the plurality of latches, respectively, or to a ground, in response to switch signals,
wherein the first input terminal of an OR gate corresponding to the most significant bit from among the plurality of OR gates is configured to receive the reset shifting signal, and
wherein the output terminal of an OR gate corresponding to the least significant bit from among the plurality of OR gates is connected to the serial binary adder circuit.

12. The image sensor of claim 11, wherein, during the third period, a switch connected to the OR gate corresponding to the least significant bit from among the plurality of switches is turned off, and the reset memory circuit is configured to calculate the first reset binary code by performing the shifting operation on the sum of the first reset binary code and the second reset binary code in response to the reset shifting signal of a high level.

13. The image sensor of claim 7, wherein the image sensor is configured to use a digital signal corresponding to the third comparison signal as auto focusing data, and to use a digital signal corresponding to the fourth comparison signal and the fifth comparison signal as image data indicating an object.

14. The image sensor of claim 7, further comprising:
a counting code generator configured to generate, as a counting code, a plurality of code values whose resolution is determined depending on a set number of bits,
wherein the counter circuit is configured to operate in response to the counting code.

15. A method of operating an image sensor which includes a pixel array including a plurality of pixel groups and an analog-to-digital converting circuit including a comparator and a counter, the method comprising:
generating, at the comparator, a first reset comparison signal by comparing a reset signal of a pixel signal with a ramp signal in a first period;
generating, at the comparator, a second reset comparison signal by comparing the reset signal of the pixel signal with the ramp signal in a second period;
generating, at the comparator, a first image comparison signal by comparing a first image signal of the pixel signal with the ramp signal in a third period;
performing, at the counter, a shifting operation on a sum of a first reset binary code and a second reset binary code respectively corresponding to the first reset comparison signal and the second reset comparison signal;
outputting, at the counter, a first digital signal based on a result of the shifting operation and a first image binary code corresponding to the first image comparison signal;
generating, at the comparator, a first sum comparison signal by comparing a sum signal of the pixel signal with the ramp signal in a fourth period;
generating, at the comparator, a second sum comparison signal by comparing the sum signal of the pixel signal with the ramp signal in a fifth period; and
outputting, at the counter, a second digital signal based on the first reset binary code, the second reset binary code, a first sum binary code corresponding to the first sum comparison signal, and a second sum binary code corresponding to the second sum comparison signal.

16. The method of claim 15, wherein each of the plurality of pixel groups includes a first pixel including a first photoelectric conversion element and a second pixel including a second photoelectric conversion element, and
wherein the first image signal is based on the first photoelectric conversion element, and the sum signal is based on the first photoelectric conversion element and the second photoelectric conversion element.

17. The method of claim 15, wherein the counter includes a parallel-in serial-out (PISO) circuit including a plurality of XOR gates connected in series, each of the plurality of XOR gates including an output terminal and a first input terminal, the output terminal of at least two of the plurality of XOR gates being connected to the first input terminal of an OR gate of a next stage,
wherein the generating the first reset comparison signal and the second reset comparison signal comprises receiving a reset control signal of a high level, at an XOR gate corresponding to a most significant bit from among the plurality of XOR gates, and wherein the generating the first sum comparison signal and the second sum comparison signal comprises receiving the reset control signal of a low level, at the XOR gate corresponding to the most significant bit.

18. The method of claim 15, wherein the counter includes a reset memory circuit including a plurality of OR gates connected in series, each of the plurality of OR gates including an output terminal and a first input terminal, the output terminal of at least two of the plurality of OR gates being connected to the first input terminal of an OR gate of a next stage, and wherein the performing the shifting operation comprises:

turning off a switch connected to an OR gate corresponding to a least significant bit from among the plurality of OR gates;

receiving a reset shifting signal of a high level, at an OR gate corresponding to a most significant bit from among the plurality of OR gates; and calculating the first reset binary code by performing the shifting operation on the sum of the first reset binary code and the second reset binary code.

19. The method of claim 18, wherein the counter includes a full adder including a first input terminal, a second input terminal receiving an output signal of the reset memory circuit, and a sum terminal, wherein the outputting the first digital signal comprises:

receiving the first image binary code, at the first input terminal of the full adder; and outputting a result of adding the first image binary code and a result of performing the shifting operation on the first reset binary code and the second reset binary code, at the sum terminal of the full adder, and wherein the outputting of the second digital signal comprises:

receiving the first sum binary code and the second sum binary code, at the first input terminal of the full adder; and outputting a result of adding the first reset binary code, the second reset binary code, the first sum binary code and the second sum binary code, at the sum terminal of the full adder.

20. The method of claim 15, further comprising:

using the first digital signal as auto focusing data to perform an autofocusing operation; and using the second digital signal as image data indicating an object to generate an output image.

* * * * *